United States Patent
Paul et al.

(10) Patent No.: US 7,382,600 B2
(45) Date of Patent: *Jun. 3, 2008

(54) CHARGE STORAGE DEVICE

(75) Inventors: George Lange Paul, Chatswood West (AU); Rory Albert James Pynenburg, Hillsboro, OR (US); Peter John Mahon, Bentleigh East (AU); Anthony Michael Vassallo, Hornsby Heights (AU); Philip Andrew Jones, Hornsby (AU); Sarkis Keshishian, Ermington (AU); Anthony Gaetano Pandolfo, Hurstville Grove (AU)

(73) Assignee: CAP-XX Limited, Dee Why, NSW (AU)

( * ) Notice: Subject to any disclaimer, the term of this patent is extended or adjusted under 35 U.S.C. 154(b) by 211 days.

This patent is subject to a terminal disclaimer.

(21) Appl. No.: 11/228,294

(22) Filed: Sep. 19, 2005

(65) Prior Publication Data

US 2007/0195486 A1  Aug. 23, 2007

Related U.S. Application Data

(63) Continuation of application No. 11/050,762, filed on Feb. 7, 2005, now Pat. No. 7,009,833, which is a continuation of application No. 10/635,775, filed on Aug. 7, 2003, now Pat. No. 6,920,034, which is a continuation of application No. 09/763,423, filed as application No. PCT/AU99/01081 on Dec. 6, 1999, now Pat. No. 6,631,072.

(60) Provisional application No. 60/110,930, filed on Dec. 5, 1998.

(51) Int. Cl.
*H01G 9/00* (2006.01)

(52) U.S. Cl. .............. 361/502; 361/503; 361/504; 361/508; 361/511; 361/512

(58) Field of Classification Search ....... 361/502–504, 361/508–512, 516–519, 523–534; 29/25.01, 29/25.03
See application file for complete search history.

(56) References Cited

U.S. PATENT DOCUMENTS

| | | | |
|---|---|---|---|
| 4,424,262 A | 1/1984 | von Alpen et al. | 429/8 |
| 4,731,705 A | 3/1988 | Velasco et al. | 361/433 |
| 5,426,561 A | 6/1995 | Yen et al. | 361/502 |
| 5,455,999 A | 10/1995 | Weiss et al. | 29/623.1 |
| 5,532,083 A | 7/1996 | McCullough | |
| 5,646,815 A | 7/1997 | Owens et al. | |
| 5,905,629 A | 5/1999 | Alford | 361/502 |
| 5,926,361 A | 7/1999 | Alford | 361/502 |
| 5,963,418 A | 10/1999 | Greenwood | 361/508 |
| 6,198,623 B1 | 3/2001 | Amatucci | 361/512 |
| 6,449,139 B1 * | 9/2002 | Farahmandi et al. | 361/502 |
| 6,456,484 B1 * | 9/2002 | Matsuoka et al. | 361/511 |
| 6,510,043 B1 * | 1/2003 | Shiue et al. | 361/502 |
| 6,697,249 B2 | 2/2004 | Maletin et al. | 361/502 |
| 6,762,926 B1 | 7/2004 | Shieu et al. | 361/502 |
| 6,920,034 B2 * | 7/2005 | Paul et al. | 361/502 |

FOREIGN PATENT DOCUMENTS

| | | |
|---|---|---|
| EP | 0 054 989 | 6/1982 |
| EP | 0 397 248 | 11/1990 |
| EP | 0 449 145 | 10/1991 |
| EP | 0 930 627 | 7/1999 |
| EP | 0 938 109 | 8/1999 |
| WO | WO98/15962 | 4/1998 |
| WO | WO99/08298 | 2/1999 |

OTHER PUBLICATIONS

Derwent Abstract Accession No. 95-305668/40, JP 7-201681 A (Hitachi, Ltd.) Aug. 4, 1995.
Derwent Abstract Accession No. 96-244423/25, JP 8-097091 A (Matsushita Denki Sangyo KK) Apr. 12, 1996.
Miller, John R., Pulse Power performance of Electrochemical Capacitors: Technical Status of Present Commercial Devices, The 8th International Seminar on Double Layer Capacitors and Similar Energy Storage Devices, vol. 8, pp. 1-10, Dec. 1998.

* cited by examiner

*Primary Examiner*—Nguyen T. Ha
(74) *Attorney, Agent, or Firm*—Kenyon & Kenyon LLP

(57) ABSTRACT

A charge storage device comprising: a first electrode; a second electrode being opposed to and spaced apart from the first electrode; a porous separator disposed between the electrodes; a sealed package for containing the electrodes, the separator and an electrolyte in which the electrodes are immersed; and a first terminal and a second terminal being electrically connected to the first electrode and the second electrode respectively and both extending from the package to allow external electrical connect to the respective electrodes, wherein the gravimetric FOM of the device is greater than about 2.1 Watts/gram. Also described is a method of manufacturing a charge storage device, the method comprising the steps of: providing a first electrode; disposing a second electrode in opposition to and spaced apart from the first electrode; disposing a porous separator between the electrodes; containing within a sealed package the electrodes, the separator and an electrolyte, wherein the electrodes are immersed in the electrolyte; and electrically connecting a first terminal and a second terminal to the first electrode and the second electrode respectively such that the terminals extending from the package to allow external electrical connection to the respective electrodes, wherein the gravimetric FOM of the device is greater than about 2.1 Watts/gram.

18 Claims, 19 Drawing Sheets

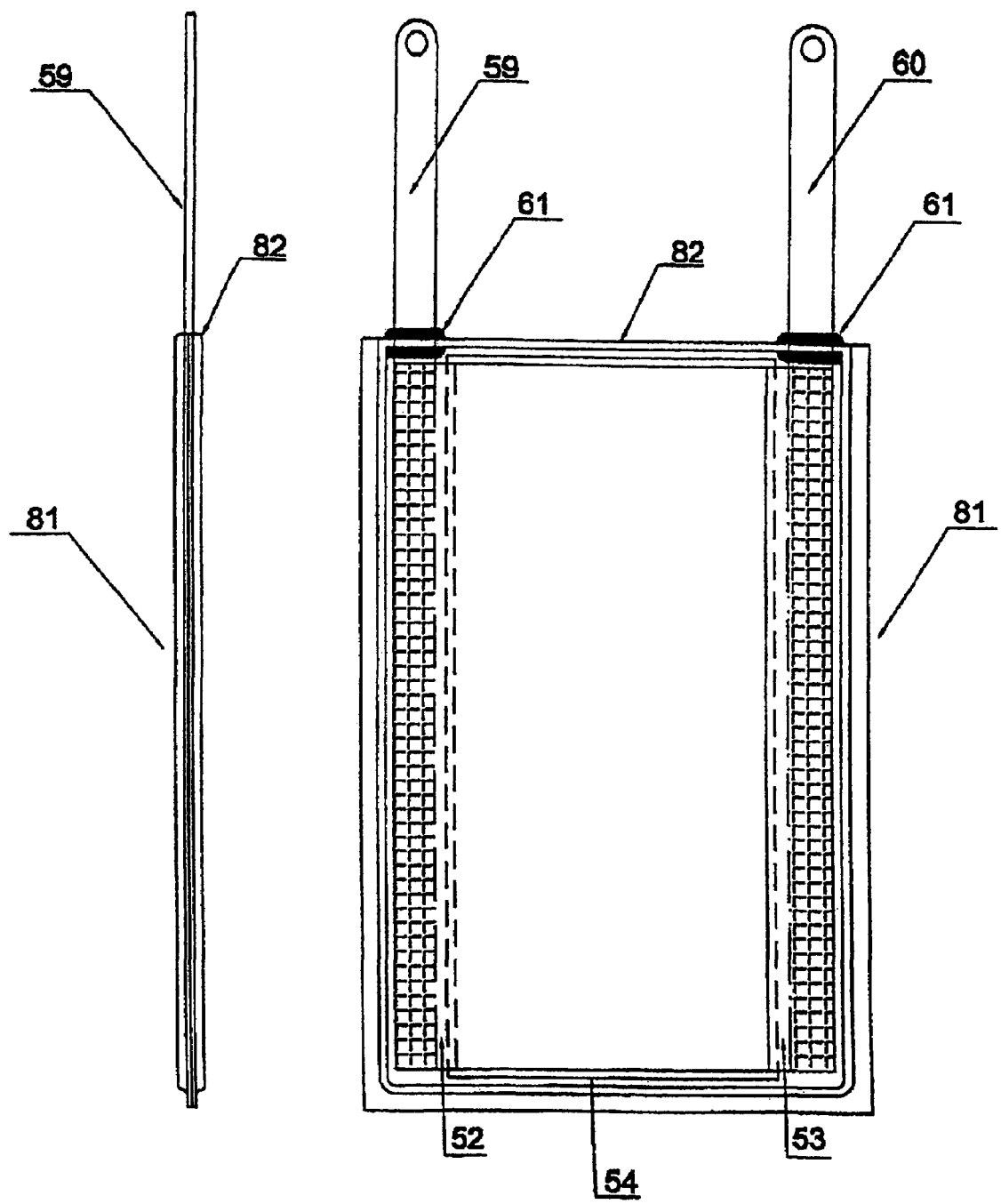

| thickness | time const | power (W/g) | power (W/cc) | resp time | FOMgrav | FOMvol |
|---|---|---|---|---|---|---|
| HF-3 | | | | | | |
| 1 | 0.00000544 | 48.64 | 128.52 | 0.0000 | 15.48 | 40.91 |
| 2 | 0.00001088 | 48.32 | 125.46 | 0.0001 | 15.38 | 39.94 |
| 5 | 0.0000272 | 47.38 | 117.1 | 0.0002 | 15.08 | 37.27 |
| 10 | 0.0000544 | 45.89 | 105.39 | 0.0003 | 14.61 | 33.55 |
| 20 | 0.0001088 | 43.17 | 87.83 | 0.0007 | 13.74 | 27.96 |
| 50 | 0.000272 | 36.46 | 58.55 | 0.0017 | 11.61 | 18.64 |
| 100 | 0.000544 | 29.3 | 37.64 | 0.0034 | 9.33 | 11.98 |
| 200 | 0.001088 | 20.9 | 21.96 | 0.0068 | 6.65 | 6.99 |
| 500 | 0.00272 | 11.24 | 9.76 | 0.0171 | 3.58 | 3.11 |
| cap-XXHIPo | | | | | | |
| 1 | 0.001653 | 98.31 | 261.02 | 0.0104 | 31.29 | 83.09 |
| 2 | 0.003306 | 97.26 | 254.81 | 0.0208 | 30.96 | 81.11 |
| 5 | 0.008265 | 94.24 | 237.82 | 0.0519 | 30.00 | 75.70 |
| 10 | 0.01653 | 89.62 | 214.04 | 0.1039 | 28.53 | 68.13 |
| 20 | 0.03306 | 81.6 | 178.77 | 0.2077 | 25.97 | 56.90 |
| 50 | 0.08265 | 64.34 | 118.91 | 0.5193 | 20.48 | 37.85 |
| 100 | 0.1653 | 47.56 | 76.44 | 1.0386 | 15.14 | 24.33 |
| 200 | 0.3306 | 31.26 | 44.59 | 2.0772 | 9.95 | 14.19 |
| 500 | 0.8265 | 15.42 | 19.82 | 5.1931 | 4.91 | 6.31 |

Figure 16

| | Capacitance F | Resistance milliohms | Voltage V | Mass g | Volume cc | Size mm x mm x mm | Response Time sec | FOM mass kW/kg | FOM Vol W/cc | Time constant sec | Pgrav max kW/kg | Pvol max W/cc | Thickness um |
|---|---|---|---|---|---|---|---|---|---|---|---|---|---|
| Prior Art 1 | | | 2.5 | 4.4 | 3.01 | 11.2 x 30.5 | 6.30E-01 | 2.06 | 3.02 | | | | |
| Prior Art 2 | | | 2.3 | 34.0 | 30.55 | 33.6 x 17.1 x 53 | 6.30E+00 | 0.98 | 1.10 | | | | |
| Prior Art 3 | | | 16.0 | 4800.0 | 1440.00 | 17 x 17 x 5 | 9.70E-02 | 0.96 | 3.20 | | | | |
| 1 HF-7 | 0.00036 | 110.43 | 2.5 | 7.3 | 3.52 | 110 x 100 x 0.32 | 1.15E-04 | 0.96 | 2.00 | 3.98E-05 | 1.93 | 4.02 | 12 |
| 2 HF-9 | 0.00074 | 86.98 | 2.5 | 7.5 | 3.83 | 110 x 100 x 0.32 | 2.50E-04 | 0.99 | 2.04 | 8.44E-05 | 2.39 | 4.95 | 24 |
| 3 HF-3 | 0.00450 | 14.60 | 2.5 | 5.8 | 4.18 | 110 x 100 x 0.38 | 3.40E-04 | 5.91 | 8.20 | 6.53E-05 | 18.57 | 25.78 | 12 |
| 4 HF-11 | 0.00112 | 75.03 | 2.5 | 7.9 | 3.86 | 110 x 100 x 0.32 | 3.70E-04 | 0.99 | 2.03 | 8.40E-05 | 2.64 | 5.41 | 36 |
| 5 HF-5 | 0.00478 | 22.88 | 2.5 | 6.8 | 3.52 | 110 x 100 x 0.32 | 5.26E-04 | 3.44 | 6.66 | 1.08E-04 | 10.10 | 19.57 | 12 |
| 6 HF-13 | 0.00548 | 27.25 | 2.5 | 7.0 | 3.52 | 110 x 100 x 0.32 | 5.71E-04 | 3.33 | 6.66 | 1.49E-04 | 8.14 | 16.29 | 12 |
| 7 HF-18 | 0.00051 | 368.50 | 2.5 | 7.7 | 3.63 | 110 x 100 x 0.32 | 8.00E-04 | 0.19 | 0.40 | 1.83E-04 | 0.57 | 1.20 | 12 |
| 8 HF-17 | 0.00130 | 190.80 | 2.5 | 7.8 | 3.86 | 110 x 100 x 0.32 | 1.25E-03 | 0.34 | 0.68 | 2.46E-04 | 1.05 | 2.13 | 36 |
| 9 HF-18 | 0.03520 | 34.10 | 2.5 | 7.2 | 3.41 | 110 x 100 x 0.32 | 6.67E-03 | 1.97 | 4.13 | 1.20E-03 | 6.40 | 13.44 | 12 |
| 10 HF-2 | 0.03200 | 70.00 | 2.5 | 5.7 | 3.96 | 110 x 100 x 0.36 | 1.40E-02 | 1.03 | 1.46 | 2.24E-03 | 3.93 | 5.84 | 12 |
| 11 cap-XX | 0.33000 | 17.80 | 2.5 | 12.0 | 9.01 | 85 x 53 x 2 | 3.70E-02 | 1.27 | 1.69 | 5.81E-03 | 7.40 | 9.85 | 12 |
| 12 cap-XXHiPo | 0.64800 | 18.10 | 5.0 | 12.2 | 9.80 | 40 x 35 x 7 | 7.63E-02 | 5.83 | 7.26 | 9.92E-03 | 26.30 | 35.24 | 6 |
| 13 cap-XX,10 | 10.40000 | 4.50 | 2.5 | 17.0 | 12.50 | 50 x 50 x 5 | 1.50E-01 | 3.60 | 4.90 | 4.66E-02 | 20.42 | 27.78 | 12 |
| 14 cap-XX,30 | 29.70000 | 5.00 | 2.5 | 25.0 | 25.00 | 50 x 50 x 10 | 4.80E-01 | 2.71 | 2.71 | 1.49E-01 | 12.50 | 12.50 | 36 |
| 15 cap-XX,250 | 272.50000 | 1.00 | 2.5 | 295.0 | 355.30 | 190 x 110 x 18 | 1.00E+00 | 2.20 | 1.83 | 2.73E-01 | 6.30 | 4.40 | 36 |
| 16 DC-3 | 17.34000 | 11.30 | 2.5 | 7.0 | 15.13 | 91 x 95 x 1.75 | 1.92E+00 | 3.28 | 1.51 | 1.96E-01 | 19.73 | 9.14 | 60/100 |
| 17 Wed | 14.88000 | 14.00 | 2.5 | 8.2 | 15.13 | 91 x 95 x 1.75 | 1.92E+00 | 2.45 | 1.33 | 2.06E-01 | 13.81 | 7.38 | 30/70 |

FIGURE 17

| | Capacitance F | Resistance milliohms | Voltage V | Mass g | Volume cc | Size mm x mm x mm | Response Time sec | FOM mass kW/kg | FOM Vol W/cc | Time constant sec | Pgrav max kW/kg | Pvol max W/cc | Thickness um |
|---|---|---|---|---|---|---|---|---|---|---|---|---|---|
| HF-1 | 0.03500 | 87.00 | 2.5 | 5.6 | 3.96 | 110 x 100 x 0.36 | 1.94E-02 | 0.80 | 1.14 | 3.05E-03 | 3.19 | 4.54 | 12 |
| HF-4 | 0.00800 | 14.40 | 2.5 | 6.4 | 4.18 | 110 x 100 x 0.38 | 5.28E-04 | 4.97 | 7.63 | 1.15E-04 | 16.90 | 25.96 | 12 |
| HF-8 | 0.00037 | 112.24 | 2.5 | 7.1 | 3.52 | 110 x 100 x 0.32 | 1.35E-04 | 0.67 | 1.35 | 4.15E-05 | 1.86 | 3.85 | 12 |
| HF-10 | 0.00077 | 85.78 | 2.5 | 7.7 | 3.63 | 110 x 100 x 0.32 | 2.50E-04 | 0.68 | 1.44 | 6.60E-05 | 2.38 | 5.02 | 24 |
| HF-12 | 0.00118 | 75.52 | 2.5 | 7.8 | 3.85 | 110 x 100 x 0.32 | 3.85E-04 | 0.71 | 1.44 | 8.91E-05 | 2.65 | 5.37 | 36 |
| HF-6 | 0.00479 | 22.68 | 2.5 | 7.7 | 3.52 | 110 x 100 x 0.32 | 5.26E-04 | 2.18 | 4.71 | 1.09E-04 | 8.98 | 19.57 | 12 |
| HF-14 | 0.00574 | 28.06 | 2.5 | 7.1 | 3.52 | 110 x 100 x 0.32 | 5.88E-04 | 2.33 | 4.71 | 1.61E-04 | 7.81 | 15.82 | 12 |
| HF-15 | 0.00054 | 376.80 | 2.5 | 8.1 | 3.63 | 110 x 100 x 0.32 | 9.09E-04 | 0.12 | 0.26 | 2.03E-04 | 0.52 | 1.14 | 12 |
| HF-19 | 0.03400 | 38.20 | 2.5 | 7.2 | 3.41 | 110 x 100 x 0.32 | 7.14E-03 | 1.26 | 2.65 | 1.30E-03 | 5.71 | 12.00 | 12 |

FIGURE 20

CHARGE STORAGE DEVICE

This is a continuation of application Ser. No. 11/050,762 filed 7 Feb. 2005 now U.S. Pat. No. 7,009,833, which is a continuation of application Ser. No. 10/635,775 filed 7 Aug. 2003, U.S. Pat. No. 6,920,034 B2, which is a continuation of application Ser. No. 09/763,423 filed 24 Aug. 2001, U.S. Pat. No. 6,631,072, which is a 371 national phase application of PCT/AU99/01081 filed 6 Dec. 1999, which claims the benefit of Provisional Application No. 60/110,930 filed 5 Dec. 1998, the contents of which are incorporated herein by reference.

BACKGROUND OF THE INVENTION

The present invention relates to a charge storage device and a method of manufacture thereof.

The invention has been developed primarily for use with the electrochemical charge storage devices such as supercapacitors and will be described hereinafter with reference to that application. It will be appreciated that supercapacitors are designated by terms such as ultra capacitors, electric double layer capacitors and electrochemical capacitors, amongst others, all of which are included within the term "supercapacitor" as used within this specification.

It is known to mass produce supercapacitors that have specific operational characteristics that fall within well defined ranges. Although mass production is advantageous from a cost point of view, there is an inherent lack of flexibility. That is, if the desired characteristics of a supercapacitor for a particular application fall outside the commonly available ranges a compromise solution is required. An alternative is to produce the desired supercapacitor as a one off or small rim. The costs of this latter alternative are often prohibitive and, as such, rarely pursued.

Known supercapacitors generally find application in power supplies such as uninterruptible power supplies for computers or backup power supplies for volatile memory. Accordingly, it has been common to optimise these supercapacitors for high energy density, low self-discharge rates, and low cost.

More recently it has been thought that supercapacitors are theoretically applicable to high power pulsed applications. Indeed, some attempts have been made to adapt such supercapacitors as short term current sources or sinks. Examples of such applications include internal combustion engine starting, load power leveling or hybrid vehicles and a variety of pulsed communication systems. However, the success of these supercapacitors has been limited by factors such as a high equivalent series resistance, among others. For example, some prior art double layer capacitors make use of button cell or spiral wound technology. These, in turn, fall generally in one of two groups, the first group being concerned with high power applications and the second with low power applications. For the second group, but not the first, it has been possible to obtain high energy densities.

The first and second groups are broadly defined by the type of electrolyte used, those being aqueous and non-aqueous respectively. This is predominantly due to the lower resistance inherently offered by aqueous electrolytes which makes it better suited to high power, and hence high current, applications. That is, the low resistance results in lower $I^2R$ losses for aqueous electrolytes. The trade off, however, is that for these aqueous electrolytes the voltage that can be applied across a capacitive cell is extremely limited.

The second group of prior art double layer capacitors suffers the converse disadvantages. That is, while they provide a greater voltage window, which improves the available energy density, they also have had high internal resistances which make them unsuitable the high power applications.

SUMMARY OF THE INVENTION

It is an object of the present invention, at least in the preferred embodiments, to overcome or substantially ameliorate one or more of the disadvantages of the prior art or at least to provide a useful alternative.

According to a first aspect of the invention there is provided a charge storage device including:

a first electrode;

a second electrode being opposed to and spaced apart from the first electrode;

a porous separator disposed between the electrodes;

a sealed package for containing the electrodes, the separator and an electrolyte in which the electrodes are immersed; and a first terminal and a second terminal being electrically connected to the first electrode and the second electrode respectively and both extending from the package to allow external electrical connection to the respective electrodes, wherein the gravimetric FOM of the device is greater than about 2.1 Watts/gram.

Preferably, the gravimetric FOM of the device is greater than about 2.5 Watts/gram. More preferably, the gravimetric FOM of the device is greater than about 3 Watts/gram. Even more preferably, the gravimetric FOM of the device is greater than about 3.5 Watts/gram. In some embodiments, the gravimetric FOM of the device is greater than about 5 Watts/gram.

More preferably, the first electrode and the second electrode form a capacitive cell and the device includes a plurality of the cells electrically connected in parallel and disposed within the package. In other embodiments, however, the cells are connected in series. In still further embodiments a combination of series and parallel connects are utilised. It will be appreciated that series connections allow the cells to be applied to higher voltage applications, while parallel connections allow the cells to provide a higher combined capacitance for the device. The ease at which these different connections are accommodated by the invention means that preferred embodiments are applicable to a wide variety of tasks ranging from high power systems to low power systems.

In a preferred form, the maximum operating voltage of the or each capacitive cell is less than about 4 Volts. More preferably, the maximum operating voltage of the or each capacitive cell is less than about 3.5 Volts. Even more preferably, the maximum operating voltage of the or each capacitive cell is less than about 3 Volts Preferably, the first electrode and the second electrode include a first carbon coating and a second carbon coating respectively wherein the surface area of carbon used in the coatings is greater than 20 $m^2$/gram.

According to a second aspect of the invention there is provided a method of manufacturing a charge storage device, the method including the steps of:

providing a first electrode;

disposing a second electrode in opposition to and spaced apart from the first electrode;

disposing a porous separator between the electrodes;

containing within a sealed package the electrodes, the separator and an electrolyte, wherein the electrodes are immersed in the electrolyte; and electrically connecting a first terminal and a second terminal to the first electrode and the second electrode respectively such that the terminals extending from the package to allow external electrical connection to the respective electrodes, wherein the gravimetric FOM of the device is greater than about 2.1 Watts.

Preferably, the gravimetric FOM of the device is greater than about 2.5 Watts/gram. More preferably, the gravimetric FOM of the device is greater than about 3 Watts/gram. Even more preferably, the gravimetric FOM of the device is greater than about 3.5 Watts/gram. In some embodiments, the gravimetric FOM of the device is greater than about 5 Watts/gram.

More preferably, the first electrode and the second electrode form a capacitive cell and the device includes a plurality of the cells electrically connected in parallel and disposed within the package. In other embodiments, however, the cells are connected in series. In still further embodiments a combination of series and parallel connects are utilised.

In a preferred form, the maximum operating voltage of the or each capacitive cell is less than about 4 Volts. More preferably, the maximum operating voltage of the or each capacitive cell is less than about 3.5 Volts. Even more preferably, the maximum operating voltage of the or each capacitive cell is less than about 3 Volts Preferably, the first electrode and the second electrode include a first carbon coating and a second carbon coating respectively wherein the surface area of carbon used in the coatings is greater than 20 $m^2$/gram.

According to a third aspect of the invention there is provided a charge storage device including:

a first electrode;

a second electrode being opposed to and spaced apart from the first electrode;

a porous separator disposed between the electrodes;

a sealed package for containing the electrodes, the separator and an electrolyte in which the electrodes are immersed; and a first terminal and a second terminal being electrically connected to the first electrode and the second electrode respectively and both extending from the package to allow external electrical connection to the respective electrodes, wherein the volumetric FOM of the device is greater than about 3.2 Watts/$cm^3$.

Preferably, the volumetric FOM of the device is greater than about 4 Watts/$cm^3$. More preferably, the volumetric FOM of the device is greater than about 5 Watts/$cm^3$. Even more preferably, the volumetric FOM of the device is greater than about 7 Watts/$cm^3$. In some embodiments, the volumetric FOM of the device is greater than about 8 Watts/$cm^3$.

More preferably, the first electrode and the second electrode form a capacitive cell and the device includes a plurality of the cells electrically connected in parallel and disposed within the package. In other embodiments, however, the cells are connected in series. In still further embodiments a combination of series and parallel connects are utilised. It will be appreciated that series connections allow the cells to be applied to higher voltage applications, while parallel connections allow the cells to provide a higher combined capacitance for the device. The case at which these different connections are accommodated by the invention means that preferred embodiments are applicable to a wide variety of tasks ranging from high power systems to low power systems.

In a preferred form, the maximum operating voltage of the or each capacitive cell is less than about 4 Volts. More preferably, the maximum operating voltage of the or each capacitive cell is less than about 3.5 Volts. Even more preferably, the maximum operating voltage of the or each capacitive cell is less than about 3 Volts Preferably, the first electrode and the second electrode include a first carbon coating and a second carbon coating respectively where the surface area of carbon used in the coatings is greater than 20 $m^2$/gram.

According to a fourth aspect of the invention there is provided a method of manufacturing a charge storage device, the method including the steps of:

providing a first electrode;

disposing a second electrode in opposition to and spaced apart from the first electrode;

disposing a porous separator between the electrodes;

containing within a sealed package the electrodes, the separator and an electrolyte, wherein the electrodes are immersed in the electrolyte; and electrically connecting a first terminal and a second terminal to the first electrode and the second electrode respectively such that the terminals extending from the package to allow external electrical connection to the respective electrodes, wherein the volumetric FOM of the device is greater than about 3.2 Watts/$cm^3$.

Preferably, the volumetric FOM of the device is greater than about 4 Watts/$cm^3$. More preferably, the volumetric FOM of the device is greater than about 5 Watts/$cm^3$. Even more preferably, the volumetric FOM of the device is greater than about 7 Watts/$cm^3$. In some embodiments, the volumetric FOM of the device is greater than about 8 Watts/$cm^3$.

According to a fifth aspect of the invention there is provided a charge storage device including:

a first electrode having a first conductive substrate;

a first carbon layer supported on the first substrate and being formed from a carbon having a surface area greater than 400 $m^2$/gram;

a second electrode having a second conductive substrate;

a second carbon layer supported on the second substrate and being formed from a carbon having a surface area greater than 400 $m^2$/gram;

a porous separator disposed between the electrodes;

a sealed package for containing the electrodes, the separator and an organic electrolyte in which the electrodes are immersed, wherein the first and second layers are opposed and spaced apart; and a first terminal and a second terminal being electrically connected to the first electrode and the second electrode respectively and both extending from the package to allow external electrical connection to the respective electrodes, wherein the volumetric FOM of the device is greater than about 1.1 Watts/$cm^3$.

According to a sixth aspect of the invention there is provided a method of manufacturing a charge storage device, the method including the steps of:

providing a first electrode having a first conductive substrate;

supporting a first carbon layer on the first substrate, the first layer being formed from a carbon having a surface area greater than 400 $m^2$/gram;

providing a second electrode having a second conductive substrate;

supporting a second carbon layer on the second substrate, the second layer being formed from a carbon having a surface area greater than 400 $m^2$/gram;

disposing a porous separator between the electrodes;

containing the electrodes, the separator and an organic electrolyte in which the electrodes are immersed in a sealed package, wherein the first and second layers are opposed and spaced apart; and electrically connecting a first terminal and a second terminal to the first electrode and the second electrode respectively such that the terminals both extend from the package to allow external electrical connection to the respective electrodes, and wherein the volumetric FOM of the device is greater than about 1.1 Watts/cm$^3$.

According to a seventh aspect of the invention there is provided a charge storage device including:

a first electrode;

a second electrode being opposed to and spaced apart from the first electrode;

a porous separator disposed between the electrodes;

a sealed package for containing the electrodes, the separator and an electrolyte in which the electrodes are immersed; and a first terminal and a second terminal being electrically connected to the first electrode and the second electrode respectively and both extending from the package to allow external electrical connection to the respective electrodes, wherein the response time ($T_0$) of the device is less than about 0.09 seconds.

Preferably, $T_0$ is less than about $10^{-2}$ seconds. More preferably, $T_0$ is less than about $10^{-3}$ seconds. Even more preferably, $T_0$ is less than about $10^{-4}$ seconds. In some embodiments, $T_0$ is less than about $5 \times 10^{-5}$ seconds.

According to an eighth aspect of the invention there is provided a method of manufacturing a charge storage device, the method including the steps of:

providing a first electrode;

providing a second electrode being opposed to and spaced apart from the first electrode;

disposing a porous separator between the electrodes;

containing the electrodes, the separator and an electrolyte in which the electrodes are immersed a sealed package; and electrically connecting a first terminal and a second terminal to the first electrode and the second electrode respectively such that the terminals extending from the package to allow external electrical connection to the respective electrodes, wherein the response time ($T_0$) of the device is less than about 0.09 seconds.

Preferably, $T_0$ is less than about $10^{-2}$ seconds. More preferably, $T_0$ is less than about $10^{-3}$ seconds. Even more preferably, $T_0$ is less than about $10^{-4}$ seconds. In some embodiments, $T_0$ is less than about 533 $10^{-5}$ seconds.

According to a ninth aspect of the invention there is provided a charge storage device including:

a first electrode;

a second electrode being opposed to and spaced apart from the first electrode;

a porous separator disposed between the electrodes;

a sealed package for containing the electrodes, the separator and an electrolyte in which the electrodes are immersed; and a first terminal and a second terminal being electrically connected to the first electrode and the second electrode respectively and both extending from the package to allow electrical connection to the respective electrodes, wherein the gravimetric power maximum of the device is greater than about 12.5 Watts/gram.

Preferably, the gravimetric power maximum of the device is greater than about 15 Watts/gram. More preferably, the gravimetric power maximum of the device is greater than about 17 Watts/gram. Even more preferably, the gravimetric power maximum of the device is greater than about 20 Watts/gram. In some embodiments the gravimetric power maximum of the device is greater than about 26 Watts/gram.

According to a tenth aspect of the invention there is provided a method of manufacturing a charge storage device, the method including the steps of:

providing a first electrode;

disposing a second electrode in opposition to and spaced apart from the first electrode;

disposing a porous separator between the electrodes;

containing within a sealed package the electrodes, the separator and an electrolyte, wherein the electrodes are immersed in the electrolyte; and electrically connecting a first terminal and a second terminal to the first electrode and the second electrode respectively such that the terminals extending from the package to allow external electrical connection to the respective electrodes, wherein the gravimetric power maximum of the device is greater than about 12.5 Watts/gram.

Preferably, the gravimetric power maximum of the device is greater than about 15 Watts/gram. More preferably, the gravimetric power maximum of the device is greater than about 17 Watts/gram. Even more preferably, the gravimetric power maximum of the device is greater than about 20 Watts/gram. In some embodiments the gravimetric power maximum of the device is greater than about 26 Watts/gram.

According to an eleventh aspect of the invention there is provided a charge storage device including:

a first electrode;

a second electrode being opposed to and spaced apart from the first electrode;

a porous separator disposed between the electrodes;

a sealed package for containing the electrodes, the separator and an electrolyte in which the electrodes immersed; and a first terminal and a second terminal being electrically connected to the first electrode and the second electrode respectively and both extending from the package to allow external electrical connection to the respective electrodes, wherein the volumetric power maximum of the device is greater than about 35 Watts/cm$^3$.

According to a twelfth aspect of the invention there is provided a method of manufacturing a charge storage device, the method including the steps of:

providing a first electrode;

disposing a second electrode in opposition to and spaced apart from the first electrode;

disposing a porous separator between the electrodes;

containing within a sealed package the electrodes, the separator and an electrolyte, wherein the electrodes are immersed in the electrolyte; and electrically connecting a first terminal and a second terminal to the first electrode and the second electrode respectively such that the terminals extending from the package to allow external electrical connection to the respective electrodes, wherein the volumetric power maximum of the device is greater than about 35 Watts/cm$^3$.

According to a thirteenth aspect of the invention there is provided a charge storage device including:

first electrode;

a second electrode being opposed to and spaced apart from the first electrode;

a porous separator disposed between the electrodes;

a sealed package for containing the electrodes, the separator and an electrolyte in which the electrodes are immersed; and a first terminal and a second terminal being electrically connected to the first electrode and the second electrode respectively and both extending from the package to allow external electrical connection to the respective electrodes, wherein the time constant of the device is less than about 0.03 seconds.

Preferably, the time constant of the device is less than about $10^{-2}$ seconds. More preferably, the time constant of the device is less than about $10^{-3}$ seconds. In some embodiments the time constant of the device is less than about $10^{-4}$ seconds.

According to a fourteenth aspect of the invention there is provided a method of manufacturing a charge storage device, the method including the steps of:

providing a first electrode;

providing a second electrode being opposed to and spaced apart from the first electrode;

disposing a porous separator between the electrodes;

containing the electrodes, the separator and an electrolyte in which the electrodes are immersed a sealed package; and electrically connecting a first terminal and a second terminal to the first electrode and the second electrode respectively such that the terminals extending from the package to allow external electrical connection to the respective electrodes, wherein the time constant of the device is less than about 0.03 seconds.

Preferably, the time constant of the device is less than about $10^{-2}$ seconds. More preferably, the time constant of the device is less than about $10^{-3}$ seconds. Even more preferably, the time constant of the device is less than about $10^{-3}$ seconds. In some embodiments the time constant of the device is less than about $10^{-4}$ seconds.

According to a fifteenth aspect of the invention there is provided a charge storage device including:

a plurality of first sheet electrodes having respective first tabs extending therefrom;

a plurality of second sheet electrodes alternated with the first electrodes and having respective second tabs extending therefrom;

a porous separator means disposed between adjacent electrodes; and a sealed package for containing the electrodes, the separator means and an electrolyte, whereby the first tabs are electrically connected to a first terminal and the second tabs are electrically connected to a second terminal, both the first and second terminals extending from the package to allow external electrical connection to the respective electrodes.

According to a sixteenth aspect of the invention there is provided a method of manufacturing a charge storage device, the method including the steps of:

providing a plurality of first sheet electrodes having respective first tabs extending therefrom;

alternating a plurality of second sheet electrodes with the first electrodes, the second sheet electrodes having respective second tabs extending therefrom;

disposing a porous separator means between adjacent electrodes;

containing within a sealed package the electrodes, the separator means and an electrolyte;

electrically connecting the first tabs to a first terminal and the second tabs to a second terminal, wherein both the first and second terminals extending from the package to allow external electrical connection to the respective electrodes.

According to a seventeenth aspect of the invention there is provided a charge storage device including:

a first sheet electrode;

a second sheet electrode disposed adjacent to the first electrode, whereby the electrodes are folded back upon their respective lengths;

a porous separator disposed between adjacent electrodes; and a sealed package for containing the electrodes, the separator and an electrolyte, whereby the first electrode is electrically connected to a first terminal and the second electrode is electrically connected to a second terminal, both the first and second terminals extending from the package to allow external electrical connection to the respective electrodes.

According to an eighteenth aspect of the invention there is provided a method of manufacturing a charge storage device, the method including the steps of:

providing a first sheet electrode;

disposing a second sheet electrode adjacent to the first electrode;

folding the electrodes are back upon their respective lengths;

disposing a porous separator between adjacent electrodes;

sealing within a package the electrodes, the separator and an electrolyte; and electrically connecting the first electrode to a first terminal and the second electrode to a second terminal, wherein both the first and second terminals extend from the package to allow external electrical connection to the respective electrodes.

According to a nineteenth aspect of the invention there is provided a multiple charge storage device including:

a first electrode being electrically connected to a first terminal;

a second electrode disposed adjacent the first electrode and being electrically connected to a second terminal;

a third electrode disposed adjacent to the first electrode and being electrically connected to the second terminal;

one or more porous separators disposed between adjacent electrodes; and a package for containing the electrodes, the one or more separators and an electrolyte, whereby the terminals extend from the package to allow external electrical connection to the respective electrodes.

According to a twentieth aspect of the invention there is provided a method of manufacturing a multiple charge storage device, the method including the steps of:

providing a first electrode;

electrically connecting the first electrode to a first terminal;

disposing a second electrode adjacent the first electrode;

electrically connecting the second electrode to a second terminal;

disposing a third electrode adjacent to the first electrode;

electrically connecting the third electrode to the second terminal;

disposing one or more porous separators between adjacent electrodes; and containing within a package the electrodes, the one or more separators and an electrolyte, whereby the terminals extend from the package to allow external electrical connection to the respective electrodes.

According to a twenty first aspect of the invention there is provided a multiple charge storage device including:

a package defining a sealed cavity containing an electrolyte;

two spaced apart capacitor terminals each extending between a first end located within the cavity and a second end external to the package;

a first capacitor cell located within the cavity and being in contact with the electrolyte, wherein the first cell has both a first predetermined time constant and two cell terminals which are electrically connected to respective capacitor terminals; and a second capacitor cell located within the cavity and being both in contact with the electrolyte and maintained in a spaced apart configuration with respect to the first cell, the second cell having both a second predetermined time constant and two cell terminals which are electrically connected to respective capacitor terminals.

According to a twenty second aspect of the invention there is provided a method of manufacturing a multiple charge storage device including the steps of:

containing an electrolyte in a sealed cavity defined by a package;

providing two spaced apart capacitor terminals each extending between a first end located within the cavity and a second end external to the package;

locating a first capacitor cell within the cavity and in contact with the electrolyte, wherein the first cell has both a first predetermined time constant and two cell terminals which are electrically connected to respective capacitor terminals; and locating a second capacitor cell within the cavity and in contact with the electrolyte while being maintained in a spaced apart configuration with respect to the first cell, the second cell having both a second predetermined time constant and two cell terminals which are electrically connected to respective capacitor terminals.

According to a twenty third aspect of the invention there is provided a multiple charge storage device including:

a first sheet electrode being electrically connected to a first terminal and having a first coating on at least one side thereof, the coating being of predetermined varying thickness;

a second electrode disposed adjacent to the first electrode and being electrically connected to a second terminal;

one or more porous separators disposed between adjacent electrodes; and a package for containing the electrodes, the one or more separator and an electrolyte, whereby the terminals extend from the package to allow external electrical connection to the respective electrodes.

According to a twenty fourth aspect of the invention there is provided a method of manufacturing a multiple charge storage device, the method including the steps of:

providing a first sheet electrode;

electrically connecting the first electrode to a first terminal;

applying a first coating on at least one side of the first electrode, the coating being of predetermined varying thickness;

disposing a second electrode adjacent to the first electrode;

electrically connecting the second electrode to a second terminal;

disposing one or more porous separators between adjacent electrodes; and containing within a package the electrodes, the one or more separator and an electrolyte, whereby the terminals extend from the package to allow external electrical connection to the respective electrodes.

According to a twenty fifth aspect of the invention there is provided a multiple charge storage device including:

a first sheet electrode being electrically connected to a first terminal and including a first coating on one side thereof and a second coating on the other side thereof, the first coating being of a first predetermined thickness and the second coating being of a second predetermined thickness;

a second sheet electrode being electrically connected to a second terminal and disposed adjacent to the one side of the first electrode, wherein the second electrode includes a third coating on one side thereof of a third predetermined thickness, the third coating being opposed to the first coating;

a third electrode being electrically connected to the second terminal and disposed adjacent to the other side of the first electrode, wherein the third electrode includes a fourth coating on one side thereof a fourth predetermined thickness, the fourth coating being opposed to the second coating;

one or more porous separators disposed between adjacent electrodes; and a package for containing the electrodes, the one or more separators and an electrolyte, whereby the terminals extend from the package to allow external electrical connection to the respective electrodes.

According to a twenty sixth aspect of the invention there is provided a method of manufacturing a multiple charge storage device, the method including the steps of:

providing a first sheet electrode;

electrically connecting the first electrode to a first terminal;

applying a first coating to one side of the first electrode and a second coating to the other side, the first coating being of a first predetermined thickness and the second coating being of a second predetermined thickness;

applying a third coating on one side of a second electrode, the third coating being of a third predetermined thickness;

disposing the second sheet electrode adjacent to the first electrode such that the third coating is opposed to the first coating;

electrically connecting the second electrode to a second terminal;

applying a fourth coating of a fourth predetermined thickness to a third electrode;

disposing the third electrode adjacent to the first electrode such that the fourth coating is opposed to the second coating;

electrically connecting the third electrode to the second terminal;

disposing one or more porous separators between adjacent electrodes; and containing within a package the electrodes, the one or more separators and an electrolyte, whereby the terminals extend from the package to allow external electrical connection to the respective electrodes.

According to a twenty seventh aspect of the invention there is provided electrodes for use in a supercapacitor, the electrodes including:

a substrate; and carbon particles mixed with a suspension of protonated carboxy-methyl-cellulose coated on the substrate.

According to a twenty eighth aspect of the invention there is provided a supercapacitor including:

at least one pair of electrodes having a mixture of carbon particles and a suspension of protonated carboxy-methyl-cellulose coated on facing surfaces of the at least one pair of electrodes;

a separator positioned between said facing surfaces of said at least one pair of electrodes; and an electrolyte wetting the separator.

According to a twenty ninth aspect of the invention there is provided a charge storage device including:

a first electrode having a first layer formed from a non-foamed carbon;

a second electrode having a second layer formed from a non-foamed carbon, the second layer being opposed to and spaced apart from the first layer;

a porous separator disposed between the electrodes;

a sealed package for containing the electrodes, the separator and an electrolyte in which the electrodes are immersed; and a first terminal and a second terminal being electrically connected to the first electrode and the second electrode respectively and both extending from the package to allow external electrical connection to the respective electrodes, wherein the surface area of the carbon used to form the first and second layers is greater than 20 $m^2$/gram.

According to a thirtieth aspect of the invention there is provided a method of manufacturing a charge storage device, the method including the steps of:

coating a first electrode with a first layer formed from a non-foamed carbon;

coating a second electrode with a second layer formed from a non-foamed carbon;

opposing the first and second layers in a spaced apart configuration;

disposing a porous separator between the electrodes;

collectively containing the electrodes, the separator and an electrolyte in which the electrodes are immersed in a sealed package; and electrically connecting a first terminal and a second terminal to the first electrode and the second electrode respectively such that the electrodes both extend from the package to allow electrical connection to the respective electrodes, wherein the surface area of the carbon used to form the first and second layers is greater than 20 $m^2$/gram.

According to a thirty first aspect of the invention there is provided a charge storage device including:

a first electrode having a first substrate and a first carbon layer supported by the substrate, the layer being formed from a carbon having a surface area of at least about 400 $m^2$/gram;

a second electrode having a second substrate and a second carbon layer supported by the second substrate, the second carbon layer being formed from a carbon having a surface area of at least about 400 $m^2$/gram, the second layer being opposed to and spaced apart from the first layer;

a porous separator disposed between the electrodes;

a sealed package for containing the electrodes, the separator and an electrolyte in which the electrodes are immersed; and a first terminal and a second terminal being electrically connected to the first electrode and the second electrode respectively and both extending from the package to allow external electrical connection to the respective electrodes, wherein the gravimetric power maximum of the device is greater than about 4.8 Watts/gram.

Preferably, the surface area of the carbon is at least 1200 $m^2$/gram. More preferably, at least one of the layers contains more than one type of carbon.

According to a thirty second aspect of the invention there is provided a method of manufacturing a charge storage device, the method including the steps of:

providing a first electrode having a first substrate and a first carbon layer supported by the substrate, the first carbon layer being formed from a carbon having a surface area of at least about 400 $m^2$/gram;

providing a second electrode having a second substrate and a second carbon layer supported by the second substrate, the second layer being formed from a carbon having a surface area of at least about 400 $m^2$/gram, the second layer being opposed to and spaced apart from the first layer;

disposing a porous separator by the electrodes;

containing the electrodes, the separator and an electrolyte in which the electrodes are immersed in a sealed package; and electrically connecting a first terminal and a second terminal to the first electrode and the second electrode respectively such that both the terminals extending from the package to allow external electrical connection to the respective electrodes, wherein the gravimetric power maximum of the device is greater than about 4.8 Watts/gram.

Preferably, the surface area of the carbon is at least 1200 $m^2$/gram. More preferably, at least one of the layers contains more than one type of carbon.

According to a thirty third aspect of the invention there is provided an energy storage device including:

a housing;

a first and a second opposed electrodes having respective first and a second charge storage capacities, the electrodes being disposed within the housing and the first charge storage capacity being greater than the second charge storage capacity;

a separator intermediate the electrodes; and an electrolyte disposed within the housing for transferring charge with the electrodes.

Preferably, the first electrode includes an aluminium sheet having a first carbon coating on one side thereof and the second electrode includes an aluminium sheet having a second carbon coating on one side thereof wherein the first and the second coatings are opposed. More preferably, the sheets are substantially dimensionally equivalent and the charge storage capacities vary due to differences between the first coating and the second coating. Even more preferably, the first coating is thicker than the second coating. In other embodiments, however, the specific capacitance of the first coating is greater than that of the second coating. That is, the first coating includes a carbon which provides a predetermined capacitance per gram, which is greater than that of the carbon included within the second coating. In further embodiments the difference in charge storage capacities is due to differences in the loading of the coatings, expressed in milligrams of coating per $cm^2$, while in other embodiments it is due to differences in active surface area of the carbon per unit area of electrode.

Preferably, the charge storage capacities are different due to a difference in surface area of the first and second electrodes.

In a preferred form the ratio of the first charge storage capacity and the second charge storage capacity is in the range of about 9:7 to 2:1. More preferably, the ratio is in the range of about 5:3 to 2:1.

In a preferred from the difference in the first and second charge storage capacities is due to the second electrode including a filler material. In some embodiments this filler material is a lower surface area carbon, while in other embodiments use is made of metal fibres or carbon nanotubes. More preferably, the filler material is conductive. Even more preferably, the first and the second electrodes ore of about the same nominal thickness notwithstanding the inclusion of the filler material.

According to a thirty fourth aspect of the invention there is provided a method of producing an energy storage device having a housing, the method including the steps of:

disposing within the housing a first and a second opposed electrodes having respective first and a second charge storage capacities wherein the first charge storage capacity being greater the second charge storage capacity;

disposing a separator intermediate the electrodes; and providing an electrolyte within the housing for transferring charge with the electrodes.

Preferably, the first electrode includes an aluminium sheet having a first carbon coating on one side thereof and the second electrode includes an aluminium sheet having a second carbon coating on one side thereof wherein the method includes the further step of opposing the first and the second coatings. More preferably, the sheets are substantially dimensionally equivalent and the method include the further step of providing differences between the first coating and the second coating to provide the variation in the charge storage capacities. Even more preferably, the first coating is thicker than the second coating. In other embodiments, however, the specific capacitance of the first coating is greater than that of the second coating.

According to a thirty fifth aspect of the invention there is provided a charge storage device including:

a housing;

a first sheet electrode disposed within the housing;

a second sheet electrode disposed within the housing adjacent to and opposed with the first sheet electrode;

a separator for enveloping substantially all of the first electrode and for maintaining the electrodes in a spaced apart configuration;

an electrolyte disposed intermediate the electrodes; and two terminals extending from the respective electrodes and terminating outside the housing for allowing external electrical connection to the electrodes.

Preferably, the separator includes two opposed separator sheets which are connected along at least one common edge and the first electrode is disposed between the separator sheets. More preferably, the separator sheets are integrally formed. Even more preferably, the separator sheets are integrally formed along the common edge.

Preferably also, each separator sheet includes a first edge and a second edge spaced apart from the first, both of which extend away from the common edge. More preferably, each separator sheet also includes a third edge which extends between the first edge and the second edge, wherein the first edges are opposed and joined together and the second edges are opposed and joined together. Even more preferably, the third edges are opposed.

In a preferred form, the first electrode includes a first sub-sheet and a second sub-sheet which is opposed to the first. More preferably, the first and the second sub-sheets are opposed. Even more preferably, each of the first and second sub-sheets are joined along a common edge. Preferably also, the common edge between the first and second sub-sheets is disposed adjacent to the common edge between two opposed separator sheets.

According to a thirty sixth aspect of the invention there is provided a method of constructing a charge storage device having a housing, the method including the steps of:

disposing at least two opposed sheet electrodes within the housing;

enveloping substantially all of a first one of the electrodes with a separator for maintaining the electrodes in a spaced apart configuration;

disposing an electrolyte intermediate the electrodes; and providing two terminals extending from the respective electrodes and terminating outside the housing for allowing external electrical connection to the electrodes.

Preferably, the separator includes two opposed separator sheets connected along at least one common edge and the method includes the further step of disposing the first electrode between the separator sheets. More preferably, the separator sheets are integrally formed. Even more preferably, the separator sheets are integrally formed along the common edge.

Preferably also, each separator sheet includes a first edge and a second edge spaced apart from the first, both of which extend away from the common edge. More preferably, each separator sheet also includes a third edge which extends between the first edge and the second edge, wherein the method includes the further step of joining together the first edges and joining together the second edges. Even more preferably, the third edges are opposed.

According to a thirty seventh aspect of the invention there is provided a charge storage device including:

two opposed electrodes having respective coatings of carbon particles, the particles having a predetermined nominal diameter and the coatings having of a thickness greater than but in the order of the nominal diameter;

a porous separator disposed between the electrodes;

a sealed package for containing the electrodes, the separator and an electrolyte in which the electrodes are immersed; and a first terminal and a second terminal being electrically connected to the first electrode and the second electrode respectively and both extending from the package to allow external electrical connection to the respective electrodes.

Preferably, the predetermined nominal diameter is less than about 8 microns and the coating thickness is less than 100 microns. More preferably, the predetermined nominal diameter is less than about 6 microns and the coating thickness is less than about 36 microns. Even more preferably, the predetermined nominal diameter is less than about 2 micron and the coating thickness is less than about 6 microns.

According to a thirty eighth aspect of the invention there is provided a method of manufacturing a charge storage device, the method including the steps of:

opposing two electrodes having respective coatings of carbon particles, the particles having a predetermined nominal diameter and the coatings having of a thickness greater than but in the order of the nominal diameter;

disposing a porous separator between the electrodes;

containing in a sealed package the electrodes, the separator and an electrolyte in which the electrodes are immersed; and electrically connecting a first terminal and a second terminal to the first electrode and the second electrode respectively for extending from the package to allow external electrical connection to the respective electrodes.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Additionally, the words 'includes', 'including' and the like are used interchangeably with the words 'comprise', 'comprising', and the like.

BRIEF DESCRIPTION OF THE DRAWINGS

FIG. 10 is a schematic front view of another supercapacitor according to the invention;

FIG. 11 is a schematic side view of the supercapacitor of FIG. 10;

FIG. 16 is a table illustrating the scalability of the invention;

FIG. 17 is a table illustrating parameters of supercapacitors of the present invention as well as some prior art supercapacitors;

FIG. 20 is a Table illustrating further examples of supercapacitors made in accordance with the invention;

DETAILED DESCRIPTION OF THE INVENTION

Figure 1:
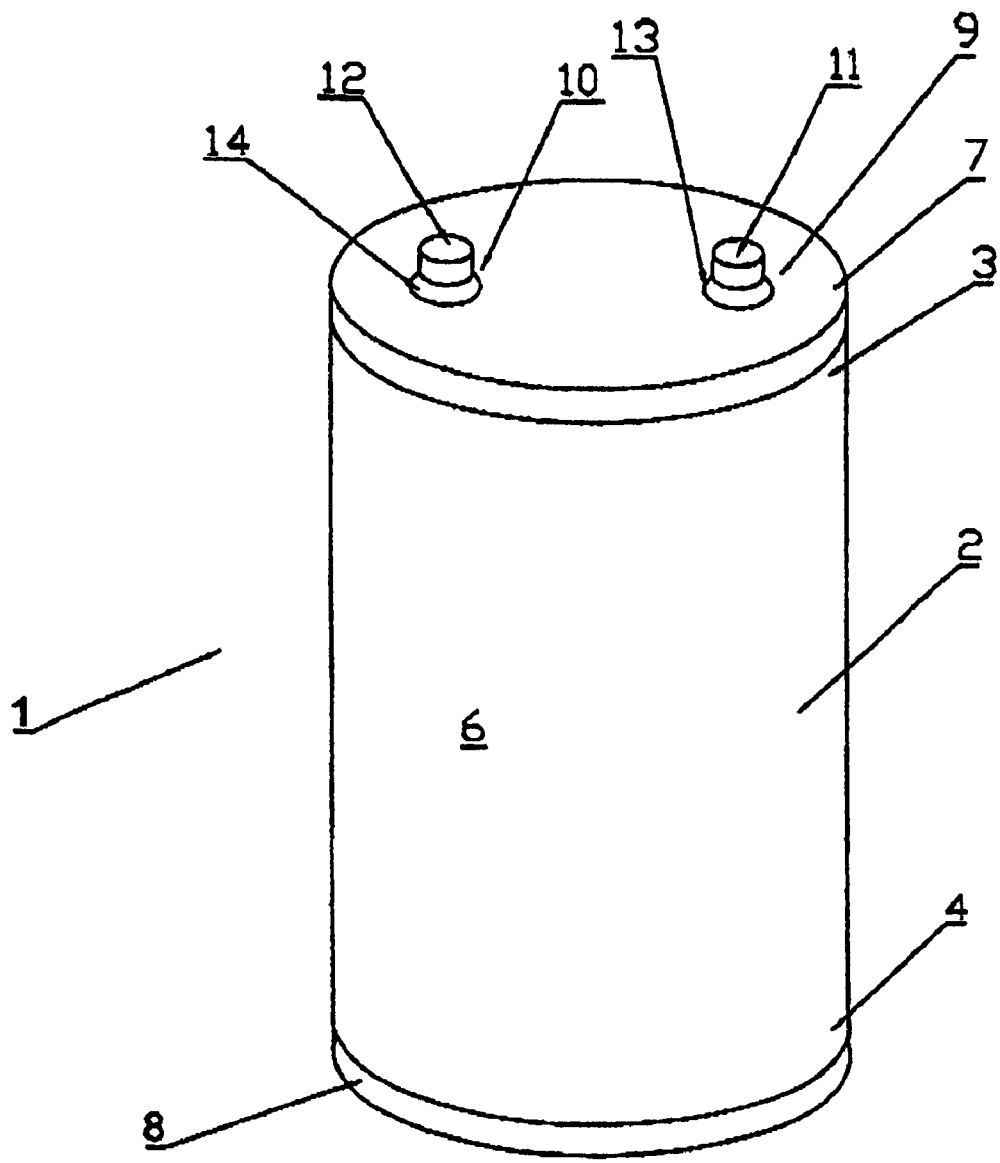
FIG. 1 is a perspective view of a charge storage device according to the invention in the form of a supercapacitor.

According to a first aspect of the invention there is provided a charge storage device including:

a first electrode;

a second electrode being opposed to and spaced apart from the first electrode;

a porous separator disposed between the electrodes;

a sealed package for containing the electrodes, the separator and an electrolyte in which the electrodes are immersed; and a first terminal and a second terminal being electrically connected to the first electrode and the second electrode respectively and both extending from the package to allow external electrical connection to the respective electrodes, wherein the gravimetric FOM of the device is greater than about 2.1 Watts/gram.

It will be appreciated that the gravimetric FOM is a figure of merit more appropriate for use with energy storage devices intended for pulse power applications. That is, such applications are by necessity frequency dependent and, as such, the calculation of the figure of merit involves first identifying the frequency $f_0$ at which the impedance of the storage device reaches a −45° phase angle. A reciprocal of $f_0$ then provides a characteristic response time $T_0$ for the storage device. The value of the imaginary part of the impedance $Z''$ at $f_0$ is used to calculate the energy $E_0$ that the device is able to provide at that frequency. More particularly:

$$E_0 = \tfrac{1}{2} C V^2$$

where $C = -1/(2 \pi f_0 Z'')$ and V is the rated voltage of the device. The gravimetric figure of merit is then calculated by dividing $E_0$ by the mass of the device and by $T_0$. That is, $$\text{gravimetric FOM} = E_0/(m.T_0)$$

The gravimetric figure of merit has been suggested by John R. Miller in a paper entitled "Pulse Power Performance of Electrochemical Capacitors: Technical Status of Present Commercial Devices" for the "8th International Seminar on Double Layer Capacitors and Similar Energy Storage Devices", Deerfield Beach, Fla., Dec. 7-9, 1998. The teachings of and disclosure within that paper are incorporated herein by way of cross reference.

Also detailed in the Miller paper is the calculation of a volumetric figure of merit (volumetric FOM) which is based upon $E_0$ divided by both $T_0$ and the volume of the device. The volumetric FOM is expressed in terms of Watts/cm$^3$.

These figures of merit provide a different characterisation of storage devices which is more in keeping with the frequency dependent nature of pulse power and other such applications to which the devices are being applied. It should also be noted that the performance of the devices can not be adequately explained by the hitherto utilised simple RC model. Such simple models do not account for the frequency dependent nature of either pulsed or high power applications, whereas the FOM used to characterise the present invention is a parameter directly relevant to such applications.

Preferably, the first electrode includes a first substrate and a first carbon layer supported by the substrate, and the second electrode includes a second substrate and a second carbon layer supported by the second substrate, wherein the first and second carbon layers are opposed and include a surface area of at least 400 m$^2$/gram and the gravimetric FOM of the device is greater than about 1 Watts/gram.

It will be appreciated that measurements herein of surface area that are expressed in m$^2$/gram are obtained from Nitrogen BET techniques.

More preferably, the surface area of the carbon layers are at least 1200 m$^2$/gram. Even more preferably, at least one of the carbon layers contains more than one type of carbon.

Even more preferably, the carbon layers are a mixture of particles of high surface area carbon and highly conductive carbon in a ratio of about 2.5:1 combined with a suspension of protonated carboxy methyl cellulose (CMC). It will be appreciated, however, that other embodiments make use of other binders. For example, another such binder is sodium CMC.

Referring now to FIG. 1, there is illustrated one embodiment of an energy storage device according to the invention in the form of a supercapacitor 1. Supercapacitor 1 is packaged in a cylindrical housing 2 which extends axially between a first end 3 and a second spaced apart end 4. In other embodiments differently configured housing are used.

The housing has a cylindrical sidewall 6 and, disposed adjacent to respective ends 3 and 4, a circular top 7 and base 8. All adjacent edges of the base, sidewall and top are sealingly engaged. In this embodiment housing 2 is formed from metal and top 7 and base 8 are sealingly adhered to sidewall 6.

Top 7 includes two diametrically spaced apart ports 9 and 10 for sealingly receiving respective terminals 11 and 12. The terminals extend from within housing 2 where they are electrically connected to respective ones or sets of electrodes of supercapacitor 1. Although a large number of possible electrodes are used in various embodiments of the invention, the most preferred will be discussed more detail below.

Terminals 11 and 12 are sealingly retained within the respective ports by rubber seals 13 and 14.

Figure 2:
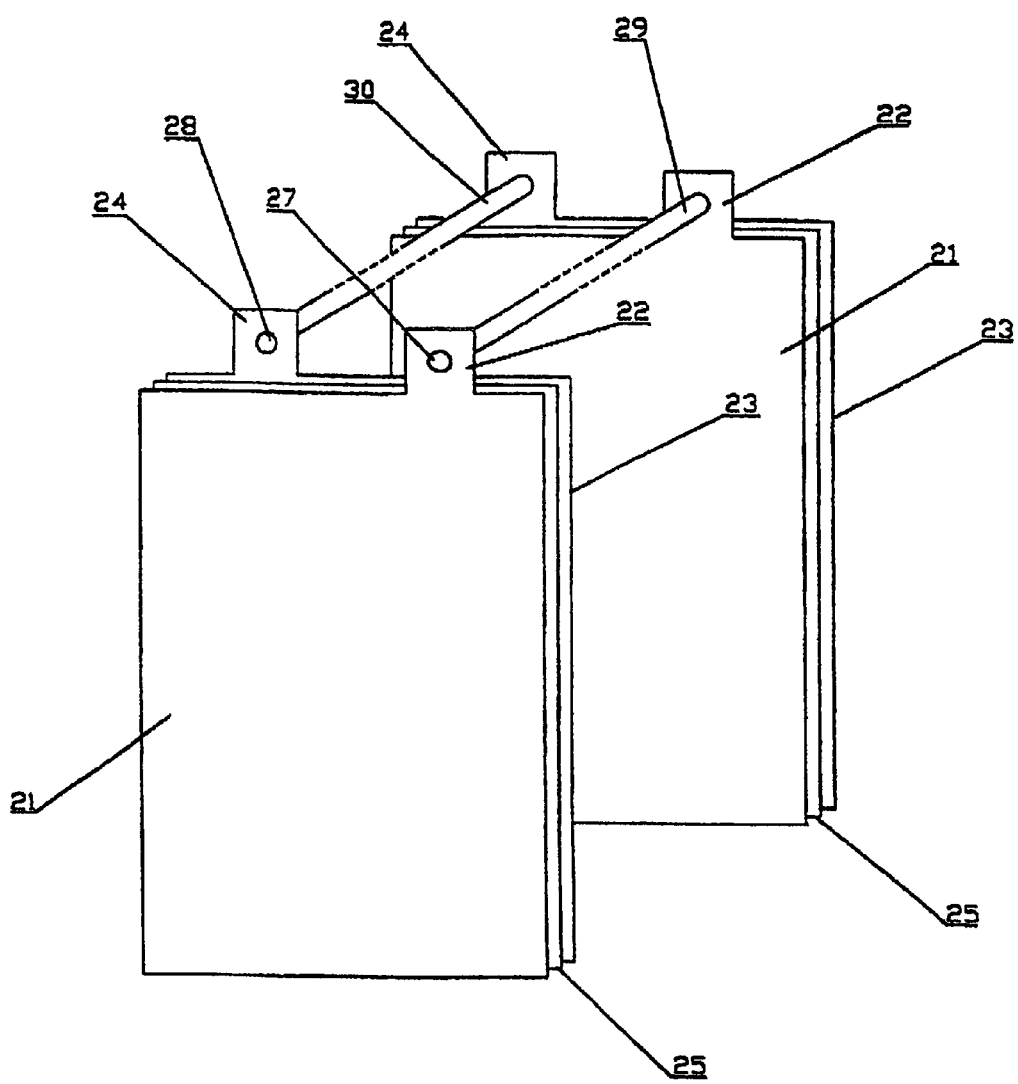
FIG. 2 is a schematic view of an electrode configuration according to a first embodiment of the invention.

A first preferred electrode configuration is illustrated in FIG. 2. More particularly, in this embodiment, supercapacitor 1 includes a plurality of first sheet electrodes 21 having respective first tabs 22 extending therefrom. A plurality of like second sheet electrodes 23 are alternated with electrodes 21 and have respective second tabs 24 extending therefrom. A plurality of porous sheet separators 25 is disposed between the adjacent electrodes. As described with reference to FIG. 1, housing 2 contains electrodes 21 and 23, separators 25 and an electrolyte (not shown). Tabs 22 are electrically connected to terminal 11 and tabs 24 are electrically connected to terminal 12 to allow external electrical connection to the respective electrodes.

It will be appreciated that although in FIG. 2 there are illustrated two electrodes 21 and two electrodes 23, the actual embodiment includes a far greater number of such sheet electrodes which are all interconnected to provide a predetermined capacitance. The invention, in this form, is particularly advantageous in that the modular unit of capacitance—one electrode 21, one electrode 23 and an intermediate separator 25—is easily mass produced and combined with a plurality of like units to provide the necessary capacitance for a particular application. Accordingly, a supercapacitor having specific performance characteristics is able to be produced easily and in small numbers at a unit cost not dissimilar to that of a large run. In some embodiments a different size housing is required. The relative cost of the housing, however, is not substantive.

Tabs 22 and 24 include respective centrally disposed apertures 27 and 28. These apertures receive respective conductive rods 29 and 30 for electrically interconnecting like tabs. The rods are, in turn, electrically connected within housing 2 to respective electrodes 11 and 12.

In some embodiments two adjacent electrodes 21 and 23 are folded together to reduce one dimension of the electrodes. This is particularly advantageous in circumstances where the packaging requirements are very specific, although a known capacitance is required.

In another embodiment, a similar effect is achieved through use of two or more sheet electrodes, and one or more intermediate separators, which are wound together in a spiral. The two sheet electrode are longitudinally elongate and transversely offset such that their opposed edges define the respective tabs. In this embodiment, the length of the sheet electrodes is tailored for the specific capacitance requirements. The manufacture of a supercapacitor of this kind will now be described in more detail. In other embodiments, such as that described with reference to FIG. 1, a similar preparation and coating technique is used. However, as will be appreciated by the skilled addressee, the sheet electrodes of FIG. 1 are stacked rather than wound.

The supercapacitor is of the double layer type and, for the spiral wound configuration, one preferred embodiment makes use of aluminium sheet electrodes that are 2500 mm long and 85 mm wide. The first step is the preparation of the coating mixture that contains:

high surface area carbon;
conductive carbon;
binder;
a surfactant; and
water.

Although the coating process makes use of a wire-bar technique it will be appreciated by those skilled in the art that other suitable techniques such as reverse roll, doctor blade or the like are also available.

Immediately after the coating procedure is finished, the electrode spools are placed in an oven to remove any remaining water and to cure the binder. This also prevents corrosion of the aluminium. The oven temperature is maintained in the range of 110° C. to 140° C. and preferably under a fan forced nitrogen atmosphere. The latter is to minimise oxidation. The curing time is at least 5 hours, although in some circumstances it is left longer, such as twelve hours, without any detriment. Prior to removing the electrodes, the oven should be allowed to cool to room temperature to minimise oxidation.

It is more convenient to coat the full width of the aluminium foil electrode and then slit to the desired width rather than coat narrow widths of foil. In some embodiments an uncoated edge is utilised and the carbon layer is applied accordingly.

Although the sheet electrode has only been coated on one side, in other embodiments it includes a coating on both sides. However, in other embodiments, rather than coating both sides, two sheets with a single sided coating are placed in a back to back configuration to define a double sided electrode. That is, the foil electrodes are adhered or otherwise secure together such that the respective carbon layer are outwardly facing and opposed to the carbon layers on adjacent electrodes.

An offset is required between the two electrodes so that each end connection will only make contact with one electrode.

In embodiments where the terminal is formed by spraying with aluminium, a flat edge is used to bend the opposed free edges of each electrode over at 90°. This stops penetration of aluminium spray used in the formation of the terminal. This bending is conveniently performed using the flat end of a 20 cm spatula while the element is turning. In preferred embodiments approximately 1 to 2 mm of the edge of the electrodes are bent over. When looking at the element down the long axis, no gaps between electrodes should be visible.

A more detailed description of the aluminium spraying process is found in co-pending PCT application number PCT/AU98/00406 the details of which are incorporated herein by way of cross reference.

Briefly, however, it will be noted that the aluminium metal spray is used to make electrical connection with the windings. Because of the very high temperature of the flame a steady movement of the gun across the elements used, with no more than about 1 to 2 seconds on each element at a distance of about 20 cm from the tip of the gun. This movement is repeated three times before the elements are turned and the remaining side sprayed. This process is repeated as often as required until an uninterrupted aluminium surface is produced, interspersed with cooling periods if the elements are hot to touch. It will be appreciated that the certain separators have a low softening temperature and will shrink in the cross direction above that temperature.

Once enough aluminium is built up, the ends are ground until a smooth flat area is obtained sufficient for the terminals to be attached. As a large amount of heat is generated during grinding care is taken not to overheat the capacitor. This flat area need not be as large as the whole end but is different for each end. The bottom end, that is the end intended to be disposed furthest from top 7, is provided with an electrode which is welded with a flat tab that radially extends from the core. Accordingly, the flat area that is at least 10 mm wide and which has a smooth surface is needed from the core to the edge. The top end terminal is welded tangentially midway between the core and the edge and so requires about one third or one half of the end to be smooth.

Laser welding of the terminal tabs is then undertaken. The equipment was a Lasag Nd:YAG laser rated at 500 W continuous. At least two 8 mm rows of welds ~3 mm apart were produced on each tab. The beam is moved at about 140 mm/min, and pulsed at 10 Hz with an energy of 29.5 Joules/pulse.

Prior to the final placing of the now formed capacitor element into the package, which is in the form of a metal can, Teflon insulators are placed between the terminals and the top sprayed aluminium face to stop the terminal from the bottom touching the top face and producing a short circuit. This insulator is a 1 mm thick Teflon disk with a 3 mm hole punched in the center with a radial slit from this hole to the edge. This hole locates the insulator on the center terminal and prevents this terminal from touching the aluminium end connection. A circular disk of Teflon is also placed in the package to insulate the bottom of the element from the can. In most cases, polypropylene foam is disposed in the base of the can to hold the element in place. In other embodiments, however, use is made of a formed plastic locater.

Once the capacitive element is in the can, a final drying step is carried out to remove any moisture. This is carried out in a vacuum oven at a maximum temperature of 80° C. This low temperature avoids softening of the separator. The low temperature drying is carried out for about 12 hours using a rotary vacuum pump, capable of producing a vacuum of better than 150 Pa.

Electrolyte is then added to the can so that the capacitive element, excluding the upwardly extending terminals, are completely covered. The pressure in the oven is gradually reduced to about 53 Pa such that air trapped in the carbon pores is removed. When the initial degassing has subsided, the vacuum is increased to 8 Pa. This process is facilitated by warming the oven to 60° C. After about 30 minutes degassing should have substantially stopped and the oven is brought to atmospheric pressure with nitrogen. Thereafter the capacitors are removed from the oven. More electrolyte is added and the process repeated until no more electrolyte is taken up. It is usual for 2 or 3 cycles to be completed. Finally, any excess electrolyte is removed.

The capacitor is then completed by mounting the top on the terminals. In this embodiment the top is made of Bakelite, although in other embodiments other materials are used. The top edge of the can is curled over the periphery of the top using a sealing tool in a small drill press at ~100 rpm.

Preferably, two types of carbon are used in the capacitor. First, a high surface area or active carbon and, secondly, a carbon such as a conductive carbon black.

The electrodes are preferably aluminium foil.

The electrolyte, in this embodiment, consists of a 1.0 M solution of tetraethylammonium tetrafluoroborate (TEATFB) dissolved in propylene carbonate (PC). That is, 217 grams of TEATFB in 1 litre of solution. The amount of water in the electrolyte is kept to an absolute minimum and preferably less than 50 ppm. Accordingly, anhydrous PC is used, such as that produced by Sigma Aldrich. Moreover, the TEATFB is exhaustively dried prior to use. This drying is achieved by vacuum oven drying at 160° C. for about six hours or such time that is sufficient to adequately reduce the moisture content.

The TEATFB is slow to dissolve, and at room temperature it is not unusual to allow 24 hours for it to fully dissolve. The present preferred method, however, reduces this time by warming the solution to 50° C. To keep the moisture content low, the preparation of electrolyte is performed inside a dry nitrogen glove box.

The separator has desirable porosity, strength and thinness for use in the present invention.

Figure 3:
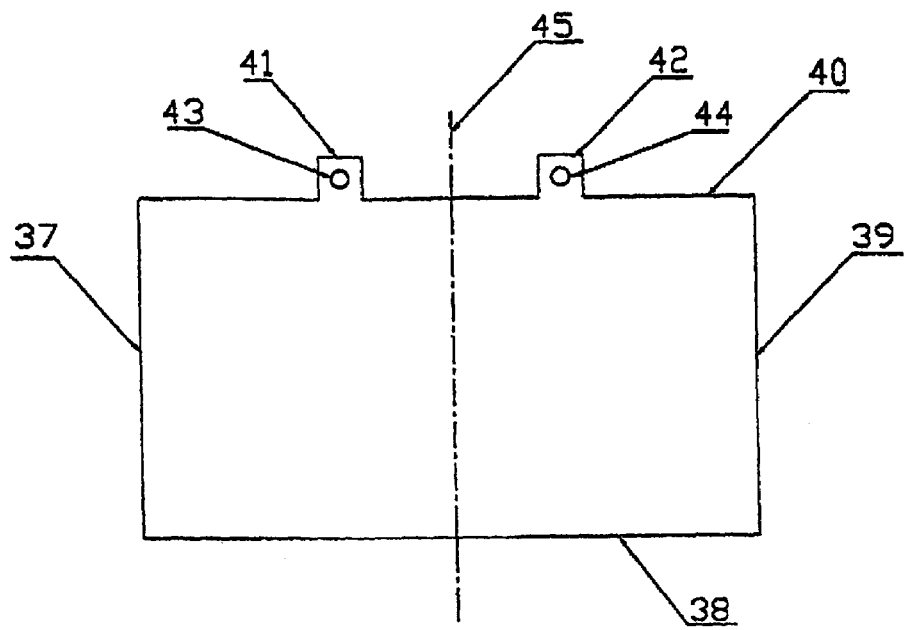
FIG. 3 is a schematic side view of a sheet electrode.
Figure 4:
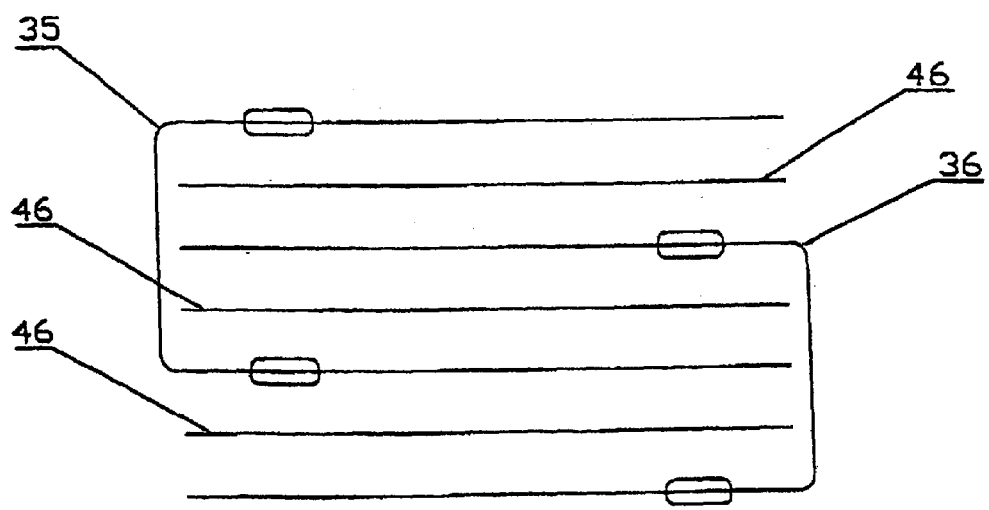
FIG. 4 is a schematic plan view of a charge storage device according to another aspect of the invention utilising an interleaved plurality of the sheet electrodes of FIG. 3.

An alternative embodiment of the invention is illustrated in FIG. 3 and FIG. 4. In this embodiment, the basic capacitive unit includes of two like sheet electrodes 35 and 36 which, as best shown in FIG. 4, are folded together. Each sheet electrode is rectangular and includes four adjacent edges 37, 38, 39 and 40. Extending outwardly from edge 40 are two symmetrically spaced apart tabs 41 and 42 having respective apertures 43 and 44. These tabs function similarly to tabs 22 and 24 of FIG. 2 in that they are connected together with a plurality of like tabs and collectively electrical joined to a terminal 11 or 12 of capacitor 1.

In use, each of electrodes 35 and 36 are centrally folded about an axis 45 which is parallel to edges 37 and 39. As shown in FIG. 4, each electrode is interleaved with the other such that edge 39 of each electrode lies adjacent to axis 45 of the other electrode. Also included between each adjacent portion of the electrodes is a porous separator 46. It will be appreciated that the FIG. 4 illustration is schematically represented to assist an understanding of the configuration of this embodiment. In practice the adjacent electrodes and separators are immediately adjacent each other rather than the spaced apart configuration shown in FIG. 4.

Electrodes 35 and 36 include on each side a layer of activated carbon that is applied as described above. However, as would now be appreciated by those skilled in the art the winding step of the above method would be substituted with a folding and then a stacking of a predetermined plurality of capacitive elements to provide supercapacitor 1 with the desired electrical characteristics.

Where use is made of a plurality of capacitive elements, a porous separator is disposed between adjacent elements to prevent electrical shorting.

In some embodiments electrodes 35 and 36 are initially coextensively abutted with a separator and then folded together.

In other embodiments edge 40 of one electrode lies adjacent to edge 38 of the other electrode such that tabs 41 and 42 extend away from each other. In some such embodiments each electrode is folded together with the other, and the intermediate separator, along a plurality of axes, each of which is parallel and spaced apart from axis 45. In still further embodiments the electrodes are folded along one or more axes which is or are normal to axis 45. In alternative embodiments electrodes 35 and 36 are folded along at least one axis parallel to axis 45 and at least one axis normal to axis 45.

To further illustrate the invention and its applications it is useful to look at the theoretical and practical underpinnings of supercapacitor development. More particularly, it will be appreciated that the supercapacitor of the invention are capable of being used in high power applications. The characteristics of such supercapacitor dictate the efficiency, size and mass required for the application. For a given mass or volume and capacitance it is the characteristic of electrical resistance (known as the equivalent series resistance or esr) which distinguishes high from low efficiency supercapacitors. That is, for high power applications a low esr is desired to minimise losses.

For any capacitor the electrical resistance can be lowered by increasing mass and volume. However, the desired result is a simultaneous decrease in resistance, mass and volume while maintaining capacitance.

The factors that contribute to electrical resistance include: the intrinsic electrical conductivity of the carbon, for carbon based supercapacitors; the interfacial resistance; the metallic electrode and connection resistance; and the electrolyte and separator resistance. Attempts have been made to minimise these factors to achieve high efficiency operation.

In a traditional capacitor, the current flow is between two flat electrodes separated by a dielectric. Although carbon based capacitors appear to be constructed in a similar fashion, the material between the metallic electrodes is not the dialectic, but the high surface area carbon, electrolyte and separator (the active materials). The dielectric is the nanometer thin layer of solvent at the carbon surface. As the current flows from the metallic electrodes through these materials, their resistance must be minimised to reduce the esr of the capacitor. This is achieved by reducing the thickness of the active materials, for example by increasing the density of the carbon coating or using thinner coatings. Another approach along these lines is to use thinner separators. The reduction of thickness also reduces the resistive component of the electrolyte by minimising the path through which the current must flow.

Another means of reducing the resistance of the active materials is to use more conductive carbons and electrolytes. The combination of more conductive active materials with thinner design allows higher powers to be achieved while maintaining or reducing the mass and/or volume.

The product of resistance and capacitance (RC), commonly referred to as the time constant, is frequently used to characterise capacitors. In an ideal capacitor, the time constant is frequency independent. However, in carbon based supercapacitors, both R and C are frequency dependent. This arises from the microporous characteristics of high surface area carbons, and the nature of charge build up at the electric double layer on the carbon surface. The traditional method of measuring R and C for supercapacitors is to use a constant current charge or discharge and to measure the voltage jump at the start or finish of the cycle, and the rate of change of voltage during the cycle respectively. This however effectively provides the R at high frequency and the C at low frequency. Another more suitable method is to measure the frequency response of the complex impedance and to model a simple RC element to the data. This provides an estimate of R and C across the frequency range that may or may not correlate with those measured using constant cart techniques. Clearly, the use of RC time constant as a measure of capacitor suitability is subject to a large uncertainty. A more useful technique has recently been proposed in which R and C are measured at the frequency at which the phase angle of current and voltage is −45°. The reciprocal of this frequency is the "response time" and is more clearly defined than other methods. Further, the capacitance at this frequency can then be used to calculate the energy and provide a Figure of Merit (FOM) when normalised with mass or volume.

The theoretical maximum power available from any capacitor is the quotient of the voltage squared over four times the esr. When normalised to mass or volume this provides the theoretical maximum power density in W/kg. Clearly the maximum power can be increased by either decreasing the resistance (as shown above), increasing the operating voltage, or both. Increases in operating voltage can be achieved, without any change in the composition of the supercapacitor materials, by maximising the voltage window in which the capacitor operates. In a supercapacitor with symmetrical carbon based electrodes, the voltage is equally distributed across both electrodes. During operation, the maximum capacitor voltage is limited by the breakdown voltage of the weakest electrode. A higher operating voltage can be achieved by tailoring the capacitance of each electrode to fully utilise the available voltage window. This is conveniently achieved by using different carbon loadings on each electrode.

Aspects of the invention described in this specification allow targeted energy and power densities to be achieved by a novel supercapacitor design and the associated manufacturing process. One result is an extremely thin, high power capacitor suitable for mobile telecommunication applications. Another is suitable for load-leveling in hybrid electric vehicle. Specific examples of these will be further illustrated by the following description.

EXAMPLES

Example 1

Figure 7:
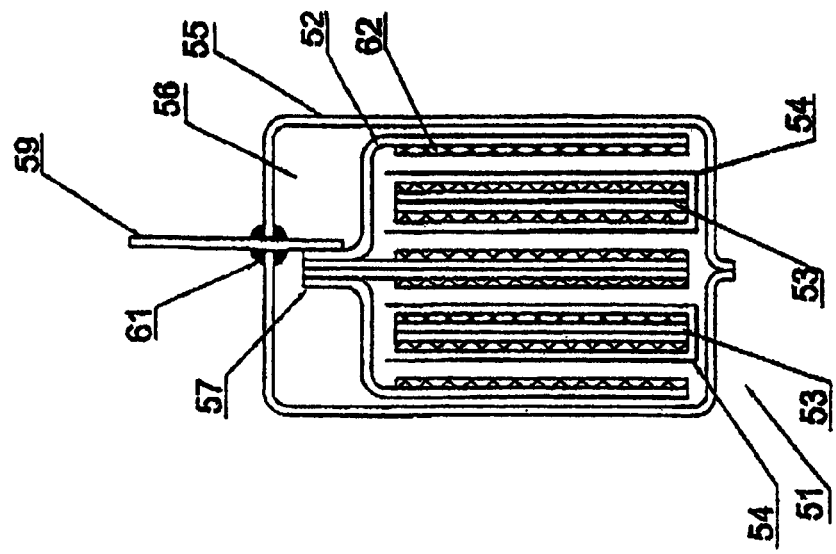
FIG. 7 is a schematic right hand side view of the supercapacitor of FIG. 5.
Figure 5:
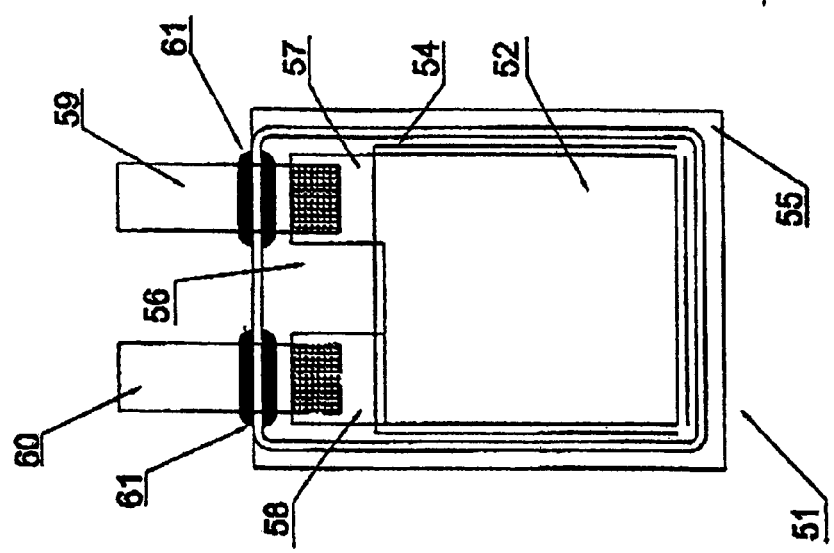
FIG. 5 is a schematic front view of an alternative supercapacitor according to the invention.
Figure 6:
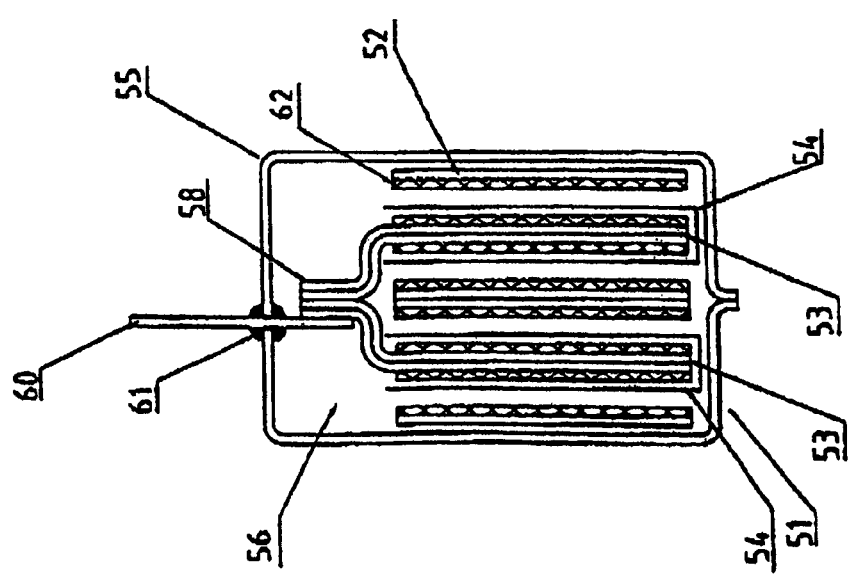
FIG. 6 is a schematic left hand side view of the supercapacitor of FIG. 5.

As schematically shown in FIGS. 5 to 7, a supercapacitor 51 includes a first electrode in the form of a first plurality of spaced apart rectangular aluminium sheets 52. A second electrode in the form of a second plurality of spaced apart rectangular aluminium sheets 53 are interleaved with and opposed to sheets 52. A plurality of porous separators 54 are interposed between the adjacent she 52 and 53. A rectangular sealed plastic package 55 contains electrodes 52 and 53, separators 54 and an electrolyte 56 in which the electrodes are immersed. In this embodiment the electrolyte is acetonitrile with TEATFB. A rectangular tab 57 and a rectangular tab 58 are integrally formed with and upwardly end from respective ones of sheets 52 and 53. Tabs 57 are abutted together and electrically connected to a terminal 59, while tabs 58 are abutted together and electrically connected to a terminal 60. This electrical connection is affected in this embodiment with ultrasonic welding. Both terminals 59 and 60 extend from package 55 to allow external electrical connection to the respective electrodes.

Each of sheets 52 and 53 have a width of about 70 mm, a height of about 170 mm and a thickness of about 20 microns. In this particular embodiment use is made of fifty of each of sheets 52 and 53, in that there are 100 sheets in total. This provides a total electrode area of 5950 cm$^2$.

As shown in the drawings, sheets 52 and 53 are each coated on a single side only with an activated carbon layer 62, as described with reference to the earlier embodiments. Where appropriate two like sheets are abutted back to back to provide outwardly facing activated carbon layers that are opposed by like carbon layers on the other of the sheets. In this embodiment layer 62 is substantially uniform across tho sheets and has a thickness of about 36 microns.

Package 55 has a rectangular prismatic form made from ABS having external dimensions of about 17 mm by 110 mm by 190 mm. Where terminals 59 and 60 extend through the package appropriate sealant 61 is used to prevent egress of electrolyte 56 from package 55 or, also importantly, the ingress of air, moisture or other contaminants into package 55.

As will be appreciated by those skilled in the art separator 54 maintains the opposed layers 62 in a spaced apart configuration to prevent electrical conduction therebetween. However, separators 52 do allow movement of the ions within the electrolyte between layers 62. In this particular embodiment separators 54 are folded around back to back pairs of sheets 53.

Supercapacitor 51 is rated at 2.5 Volts and provides a nominal capacitance of 270 Farads. Importantly, however, the overall weight, including the electrolyte and packaging, is 295 grams. Utilising these figures, in combination with a measured $T_0$ of 1 second provides a gravimetric FOM of 2.2 Watts/gram and a volumetric FOM of 1.6 Watts/cm$^3$.

When utilising the simple RC model the equivalent series resistance is about 1 mΩ and the RC time constant is about 280 ms.

Example 2

Figure 9:
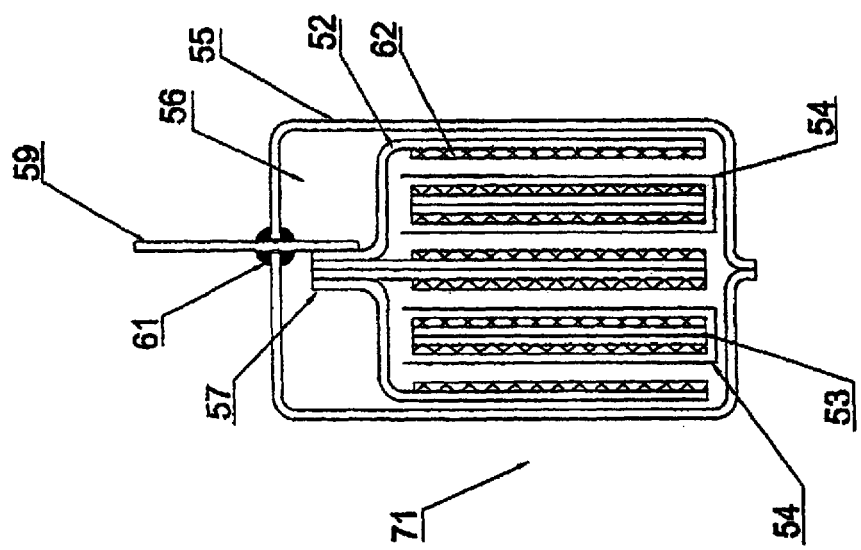
FIG. 9 is a schematic side view of the supercapacitor of FIG. 8.
Figure 8:
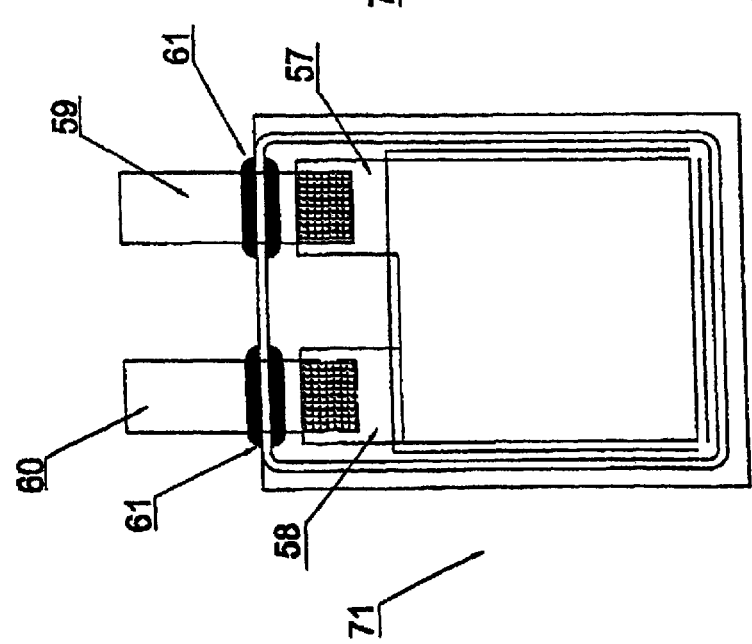
FIG. 8 is a schematic front view of a further alternative supercapacitor according to the invention.

Another specific example of a supercapacitor 71 made in accordance the invention is schematically illustrated in FIGS. 8 and 9. In these Figures corresponding features are denoted by corresponding reference numerals.

Each of sheets 52 and 53 have a width of about 40 mm, a height of about 40 mm and a thickness of about 20 microns. In this particular embodiment use is made of forty of each of sheets 52 and 53, in that there are eighty sheets in total. This provides a total electrode area of 640 cm$^2$.

In this embodiment layer 62 is again substantially uniform across the sheets and has a thickness of about 36 microns.

Package 55 has a rectangular prismatic form made from ABS having external dimensions of about 10 mm by 50 mm by 50 mm.

Supercapacitor 71 is rated at 2.5 Volts and provides a nominal capacitance of 30 Farads. The overall weight, including the electrolyte and packaging, is 25 grams. Utilising these figures, in combination with a measured $T_0$ of 0.48 second provides a gravimetric FOM of 2.71 Watts/gram and a volumetric FOM of 2.71 Watts/cm$^3$. When utilising the simple RC model the equivalent series resistance is about 4 m 106 and the RC time constant is about 120 ms.

Example 3

Another specific example of a supercapacitor made in accordance the invention is of the same construction of that shown in FIGS. 8 and 9. However, in this embodiment use is made of twenty of each of sheets 52 and 53, in that there are forty sheets in total. This provides a total electrode area of 320 cm$^2$.

In this embodiment layer 62 is again substantially uniform across the sheets and has a thickness of about 12 microns.

Package 55 has a rectangular prismatic form made from ABS having external dimensions of about 5 mm by 50 mm by 50 mm.

The supercapacitor of this example is rated at 2.5 Volts and provides a nominal capacitance of 10 Farads. The overall weight, including the electrolyte and packaging, is 17 grams. Utilising these figures, in combination with a measured $T_0$ of 0.11 seconds provides a gravimetric FOM of 2.64 Watts/gram and a volumetric FOM of 3.00 Watts/cm$^3$.

When utilising the simple RC model the equivalent series resistance is about 5 mΩ and the RC time constant is about 50 ms.

Example 4

Figure 11A:
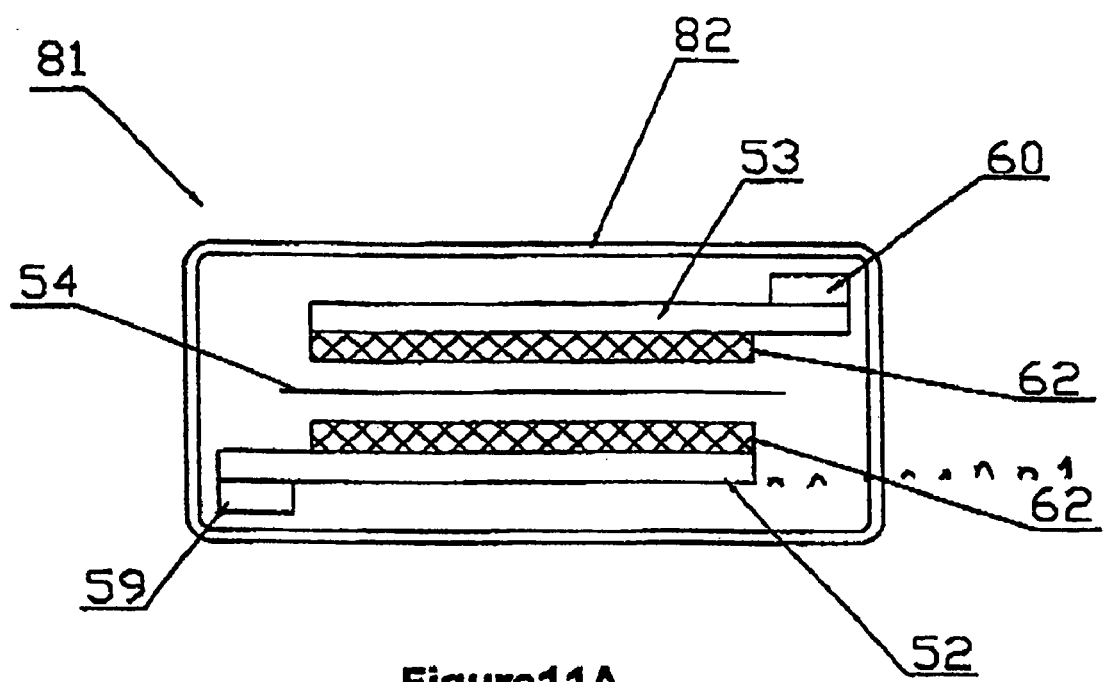
FIG. 11A is a schematic cross sectional of the supercapacitor of FIG. 10.

There is shown in FIGS. 10, 11 and 11A a supercapacitor 81, where corresponding features are denoted by corresponding reference numerals. As with the other examples described above, use is made of sheet electrodes. However, these sheets are contained within a package 82 the size of a credit card or smart card.

Each of sheets 52 and 53 have a width of about 40 mm, a height of about 65 mm and a thickness of about 20 microns. In this particular embodiment use is made of three of each of sheets 52 and 53, in that there are six sheets in total. This provides a total electrode area of 78 cm$^2$.

Again, layer 62 is substantially uniform across the sheets and has a thickness of about 12 microns.

Package 55 has a rectangular prismatic form made from PVC sheets and having external dimensions of about 2 mm by 54 mm by 86 mm.

Supercapacitor 81 is rated at 2.5 Volts and provides a nominal capacitance of 0.3 Farads. The overall weight, including the electrolyte and packaging, is 12 grams. Utilising these figures, in combination with a measured $T_0$ of 0.037 seconds provides a gravimetric FOM of 1.27 Watts/gram and a volumetric FOM of 1.68 Watts/cm$^3$. When utilising the simple RC model the equivalent series resistance is about 22.5 mΩ and the RC time constant is about 6.3 ms.

Example 5

Figure 18:
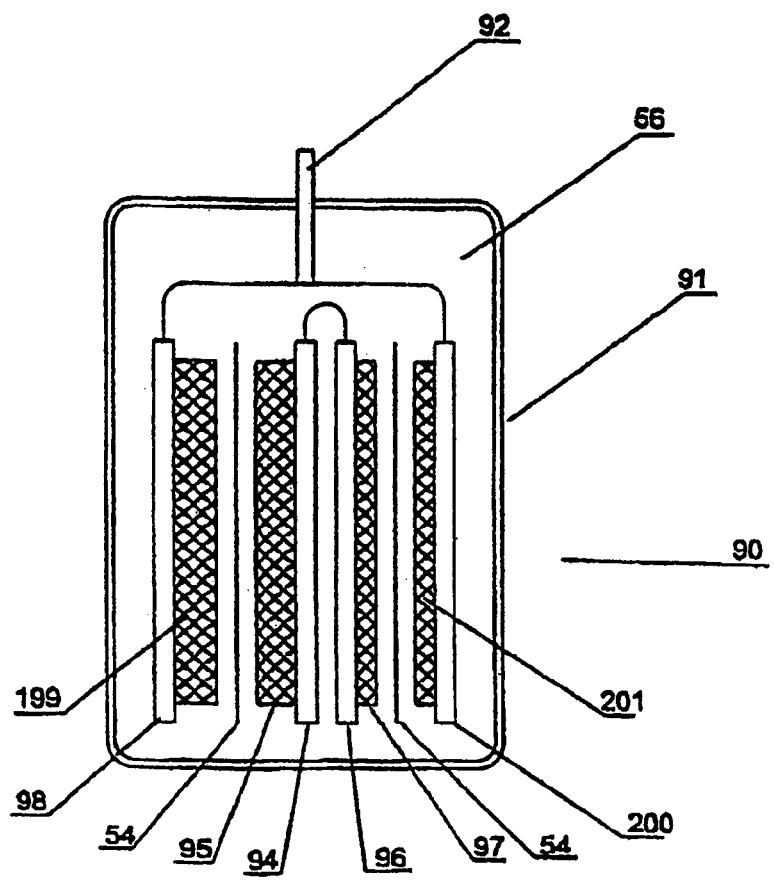
FIG. 18 is a schematic cross sectional view of a supercapacitor according to another aspect of the invention.

A multiple charge storage device in the form of a supercapacitor 90 is schematically illustrated in FIG. 18. Supercapacitor 90 includes a first sheet electrode which is collectively defined by aluminium sheets 94 and 96. In other embodiments a single folded sheet is used. It will be appreciated by those skilled in the art that a single sheet could also be used.

Both sheets 94 and 96 are electrically connected to a first terminal (not shown). Sheet 94 includes a first coating 95 on one side thereof, while the opposite side of sheet 96 includes a second coating 97. The first coating is of a first predetermined thickness and the second coating is of a second predetermined thickness which is different from the first thickness. A second sheet electrode 98 is electrically connected to a second terminal 92 and is disposed adjacent to the one side of electrode 94. Also, electrode 98 includes a third coating 199 on one side thereof of a third predetermined thickness which is equal to the first predetermined thickness. Coating 199 is opposed to coating 95. A third electrode 200 is electrically connected to terminal 92 and is disposed adjacent to sheet 96. Electrode 200 includes a fourth coating 201 on one side thereof which is of a fourth predetermined thickness. Moreover, coating 201 is opposed to coating 97. As with other embodiments, a plurality of porous separators are disposed between respective adjacent electrodes. Additionally, supercapacitor 90 includes a package 91 for containing the electrodes, the one or more separators and an electrolyte and through which the terminals extend to allow external electrical connection to the respective electrodes.

All the coatings of this embodiment utilise the same formulation. The differing thicknesses, however, provide supercapacitor 90 with a multiple time constant given that the two capacitive cells making up the supercapacitor are in parallel with each other. In this case, a cells are defined by the respective opposed and adjacent carbon coatings.

In other embodiments the thicknesses of the coatings are the same and the formulation of the coating varies between cells to provide a difference in capacitance. This, in turn, provides a multiple time constant supercapacitor.

Example 6

Figure 19:
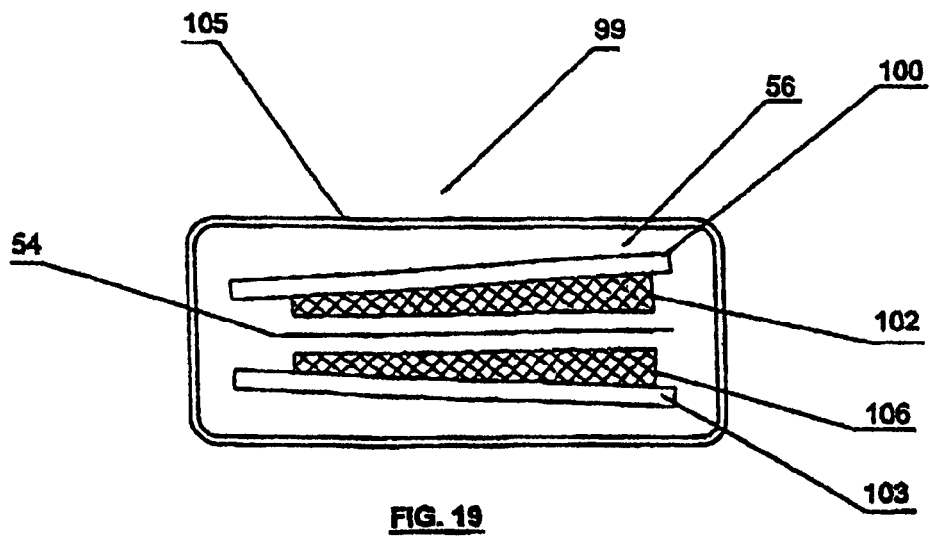
FIG. 19 is a schematic cross sectional view of a supercapacitor according to a further aspect of the invention.

An alternative multiple charge storage device in the form of supercapacitor 99 is schematically illustrated in FIG. 19. This supercapacitor includes a first sheet electrode 100 which is electrically connected to a first terminal (not shown) and which includes a first coating 102 on one side thereof having a first predetermined thickness. A second sheet electrode 103 is electrically connected to a second terminal (not shown) and is disposed adjacent to electrode 100. The second electrode includes a second coating 106 on one side thereof having a second predetermined thickness. As shown, coating 106 is opposed to coating 102.

A porous separator 54 is disposed between the adjacent electrodes for maintaining those electrodes in a fixed spaced apart configuration. Additionally, a package 105 contains the electrodes, the separator and an electrolyte, whereby the terminals (not shown) extend from the package to allow external electrical connection to the respective electrodes.

This arrangement of a varying carbon thickness across the separate electrodes also provides a multiple time constant supercapacitor.

For convenience, the electrode pair shown in FIG. 19 is defined as a cell. In other embodiments, use is made of a plurality of like cells stacked together and connected in parallel to provide the desired capacitance. Preferably, also, the cells are stacked such that the thinner end and the thicker end of one cell are juxtaposed to the respective thicker end and the thinner end of at least one adjacent cell.

Figure 12:
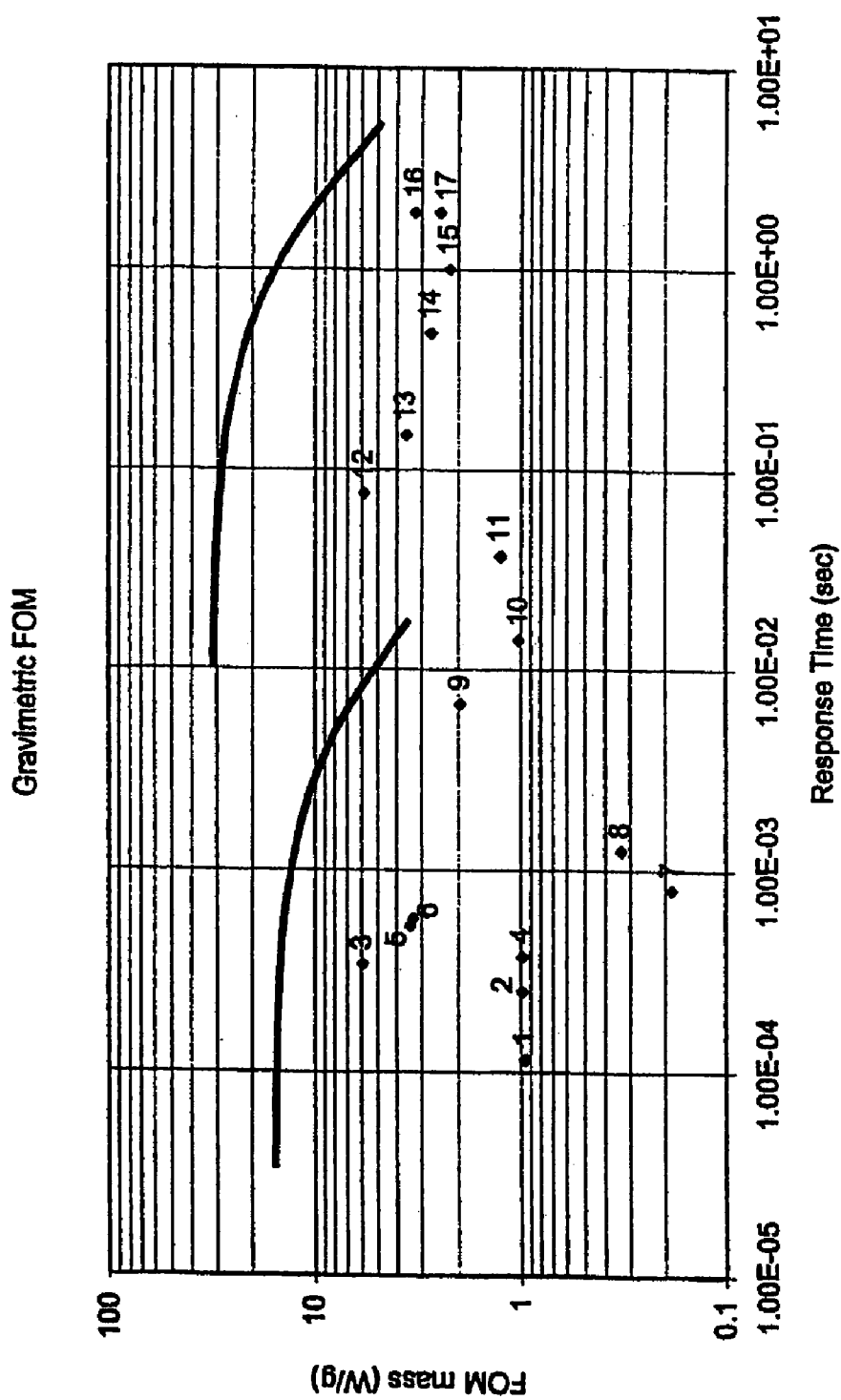
FIG. 12 is a graph of the gravimetric FOM versus $T_0$ for specific examples of the invention.
Figure 13:
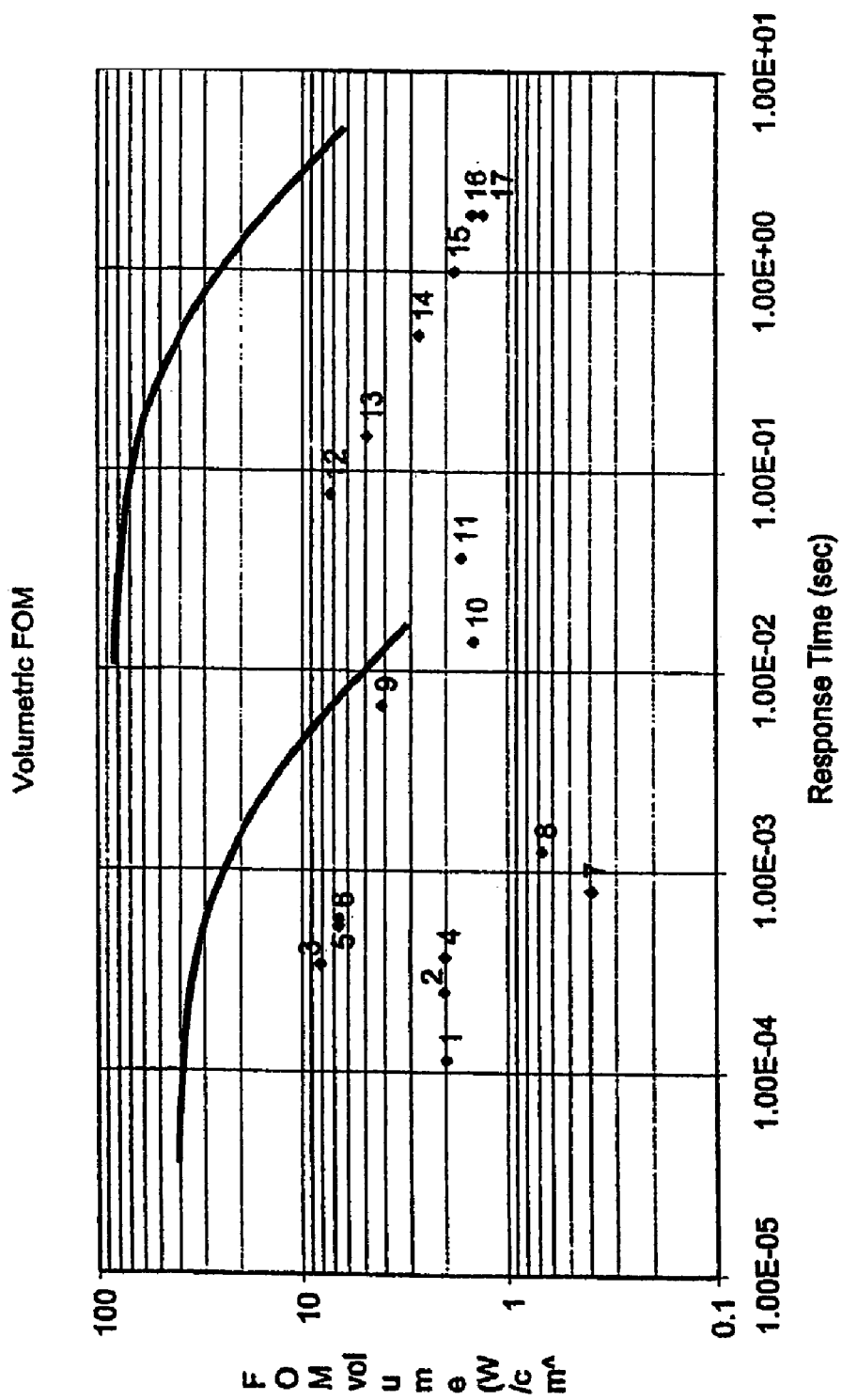
FIG. 13 is a graph of the volumetric FOM versus $T_0$ for specific examples of the invention.

In other embodiments use is made of constructions similar to that of the above examples but with different physical parameters to provide different characteristics. Some examples of such alternative physical parameters and resultant characteristics are shown in the Table of FIG. 17 and FIG. 20. For ease of reference, FIG. 12 provides a graphical representation of the gravimetric FOM versus $T_0$ for the examples of the invention listed in FIG. 17, where the respective locations of the supercapacitors on the reference plane are represented by numerals corresponding to the item number in the Table of FIG. 17. FIG. 13 provides a corresponding representation for the example supercapacitors showing volumetric FOM versus $T_0$.

The supercapacitor shown as Item 12 in FIG. 17 includes a parallel combination of pairs of capacitive cells that are connected in series. Accordingly, the nominal operational voltage is 5 Volts. In other embodiments more than two capacitive cells are connected in series to provide a higher operating voltage.

It is also useful to characterise the capacitors of the present invention with criteria more commonly used in the field. More particularly, the maximum power ($P_{max}$) available from a supercapacitor has been calculated with the formula:

$$P_{max} = V^2/4R$$

where V is the maximum operating voltage of the capacitor and R is the resistance determined from the simple RC model of the capacitor.

Figure 14:
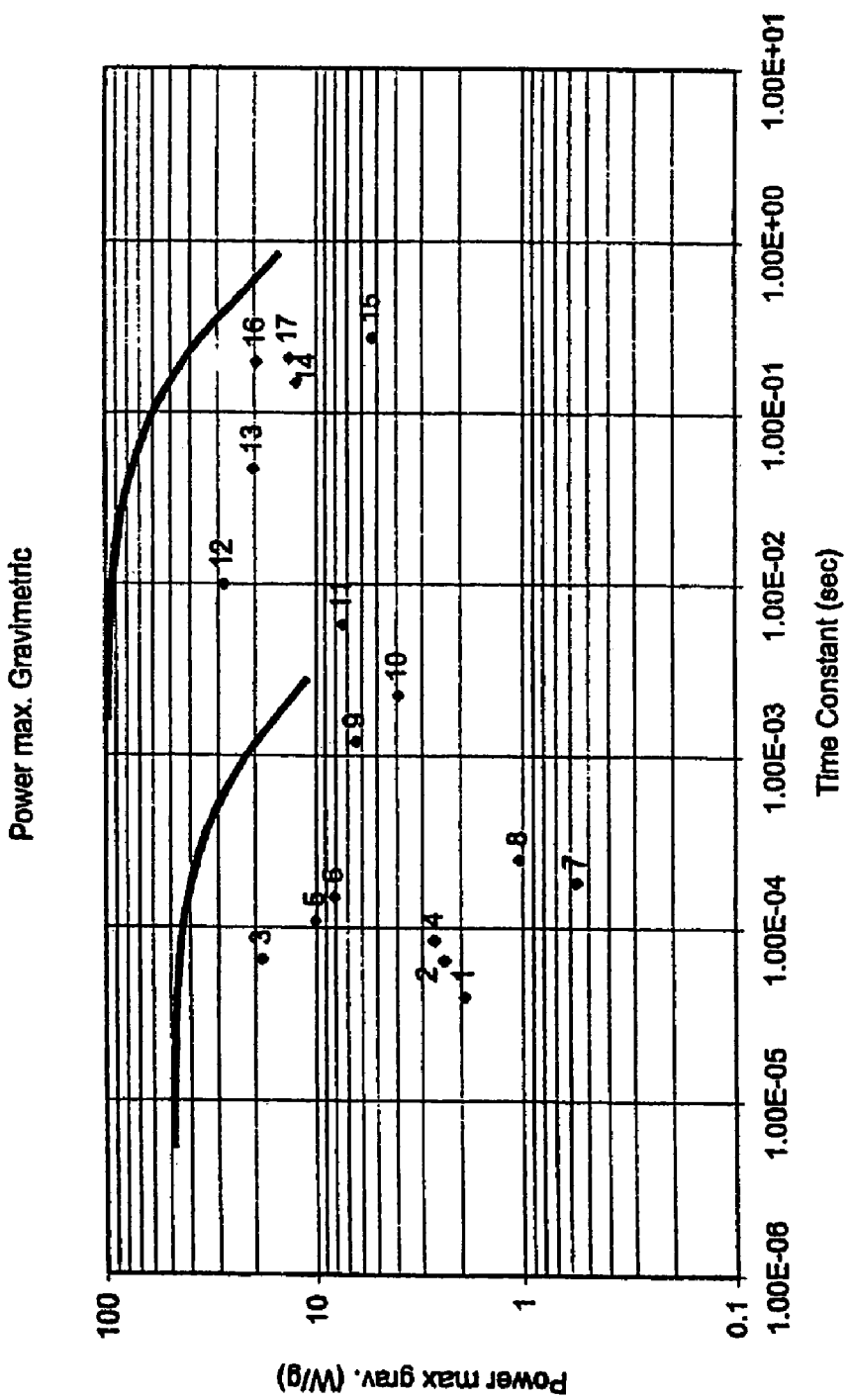
FIG. 14 is a graph of the gravimetric power maximum versus time constant for the specific examples of the invention.
Figure 15:
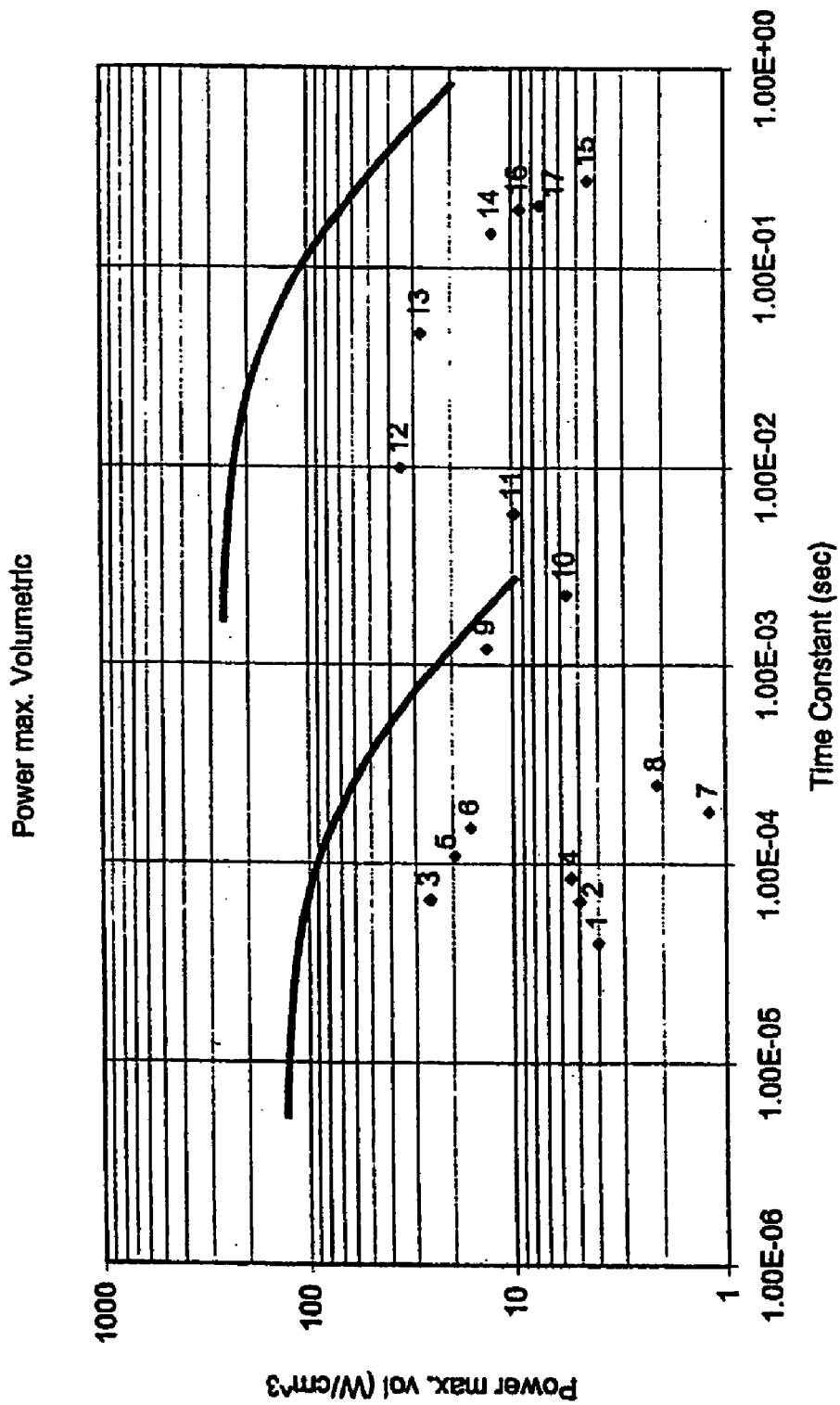
FIG. 15 is a graph of the volumetric power maximum versus time constant for specific examples of the invention.

The $P_{max}$ values for the examples in FIG. 17 have been calculated and divided, on the one hand by the mass of the respective devices to provide a gravimetric $P_{max}$ and, on the other hand, by the volume of the respective devices to provide a volumetric $P_{max}$. These values have then been plotted in FIGS. 14 and 15 respectively again time constants.

As particularly illustrated FIGS. 12 to 15 inclusive, the supercapacitors described in the examples above provide extremely advantageous pulse power load characteristics. That is, a low response time $T_0$ and time constant ensures good transient response to high frequency loads, as are encountered in applications where switching or pulsing of the load occurs. This, in combination with the high gravimetric FOM and $P_{max}$, and the high volumetric FOM and $P_{max}$ provided in the examples, allow the invention to be applied to a broad range of applications. To illustrate this point, the supercapacitor of Example 1 is intended primarily for high power automotive applications to facilitate regenerative breaking and the provision of high torque over short time periods, and the necessity for correspondingly high current loads. The supercapacitor of Example 4, however, is primarily intended to be used in parallel with a mobile telephone battery.

The graphs of FIGS. 12 to 15 each include two unbroken lines, which extend across the upper regions of the ranges shown. In each case the lines represent the theoretical upper limit of the various parameters being illustrated for the examples 3 and 12 shown in FIG. 17. For a given combination of features and the given formulation of the carbon coating, there will be a theoretical maximum where the volume or mass contribution of the packaging to the overall device is small. For other formulations the theoretical maximum will differ.

With the benefit of the teaching herein the skilled addressee would appreciate that the invention is also advantageous in that various parameters of the supercapacitor are easily tailored to meet the specific requirements of any particular application. That is, the invention is particularly suited to scaling. By way of example, FIG. 16 shows various calculated characteristics for a number of other embodiments of the invention. This illustrates that for a given formulation, thinner layers higher provide higher power densities and figures of merit, as well as lower time constants and response times.

It will be understood that the unbroken lines included in the Figures represent the limit for the two given formulations. However, there are other formulations which provide an extended range of operability and allow higher figures of merit and power densities, as well as lower time constants, to be achieved.

The calculations in FIG. 16 are based on the resistance of the devices being comprised of the resistance of:
1. the terminals;
2. the aluminium electrodes;
3. the electrode/carbon interface;
4. the carbon inter-particle interface;
5. the electrolyte in the carbon layer; and
6. the electrolyte in the separator.

The present invention makes use of this model to optimise the various resistances while still providing a high capacitance, high figures of merit, high power densities and a desired response time.

The gravimetric FOM is expected to scale as the gravimetric power density, and the volumetric FOM is expected to scale as the volumetric power density. These latter quantities are proportional to: $V^2$; $1/R$ and either $1/mass$ or $1/Volume$. Thus, for a given voltage optimised for the application, an increase in FOM comes through decreasing R, decreasing mass and decreasing volume. For a given formulation and given thickness of coating R is essentially proportional to the inverse of the electrode area. For minimal packaging mass or volume, the mass and volume are proportional to the electrode area. Thus making a "bigger" device will only marginally increase the FOM due to less packaging. Hence, for a given size of device, the resistance is minimised by decreasing the thickness of the coating consistent with the time constant or response time desired for the device. The capacitance of the device is then determined by the selection of the mix of carbons and the formulation of the coating material.

The inventors also believe that the superior performance of supercapacitors of the present invention is contributed to by the improved conductivity between individual carbon particles resulting from the use of the mixture of carbon particles and protonated carboxy methyl cellulose (CMC). Without wishing to be bound by theory, it is believed that such improved conductivity is the result of a number of factors such as increased packing density of individual carbon particles; increased migration of electrolyte into intra-molecular spaces on the surface of the individual carbon particles; and an overall reduction in the size of the interface region between the carbon particles and electrolyte. It is believed that a mixture of high surface area carbon and highly conductive carbon optimises these effects.

Further, the relative insolubility of protonated CMC contributes to an increased overall life of the supercapacitors of the present invention.

It will be appreciated that the term "immersed" or like terms, unless explicitly noted otherwise, when used in reference to the disposition of the electrodes in the electrolyte is intended to include not only those supercapacitors where an excess of electrolyte is used, but also those where the quantity of electrolyte is sufficient to only wet the electrodes. That is, the quantity of electrolyte need be sufficient to allow operation of the supercapacitor.

It will also be appreciated that although the above examples are primarily concerned with discrete cells, the invention is also applicable to bipolar configurations.

Moreover, it will be appreciated that the term "organic electrolyte" or like terms refer to an electrolyte in an organic solvent.

For comparative purposes FIG. 17 provides a Table showing parameters of supercapacitors of the present invention as well as some prior art supercapacitors.

Figure 21:
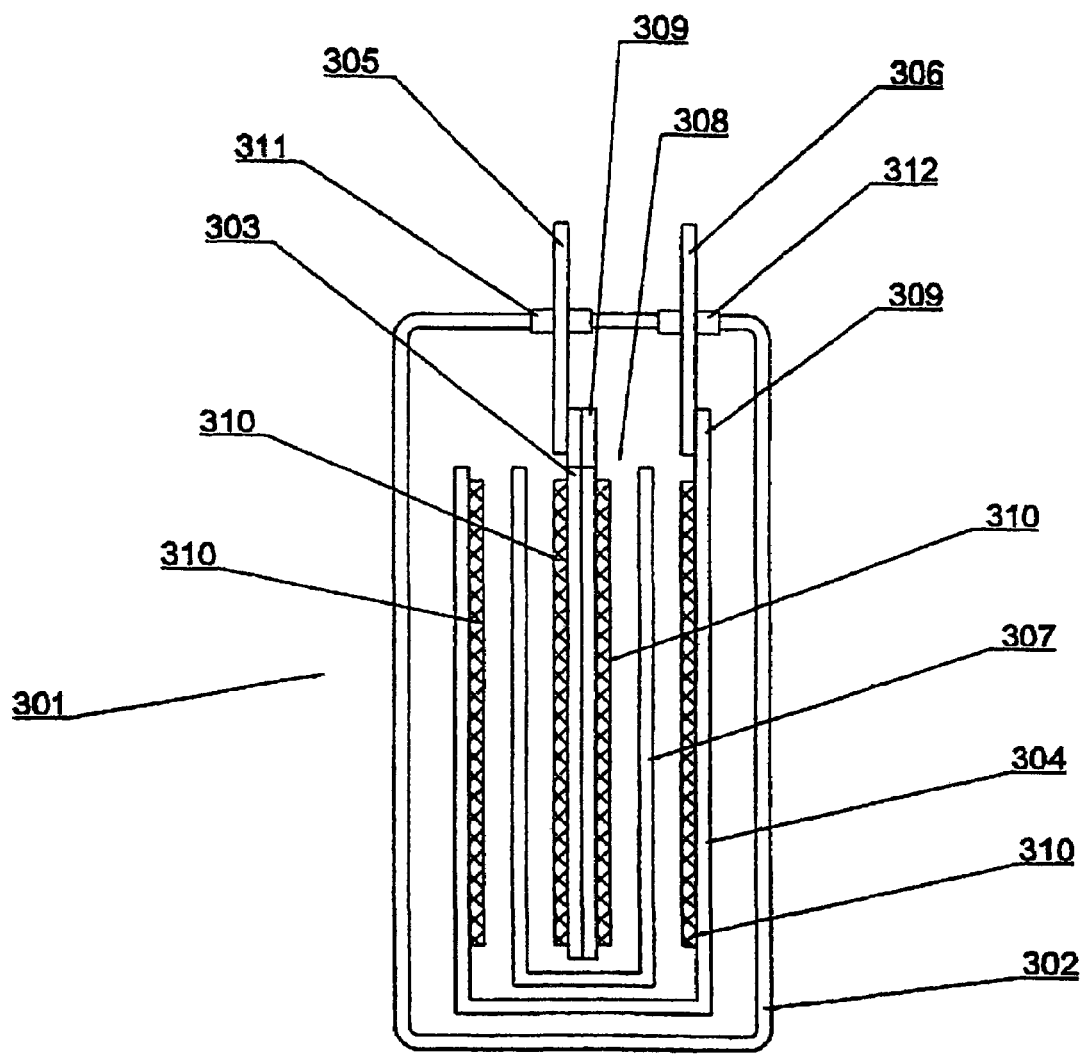
FIG. 21 is a schematic cross section of a supercapacitor according to one embodiment of the invention.

Referring to FIG. 21, a charge storage device 301 includes a sealed prismatic housing 302. Two opposed folded rectangular aluminium electrodes 303 and 304 are disposed within housing 302 and connected to respective metal terminals 305 and 306 for allowing external electrical connection to the electrodes. A Solupor™ sheet separator 307 is disposed intermediate electrodes 303 and 304 for maintaining those electrodes in a fixed spaced apart configuration. An electrolyte (not shown) is also disposed intermediate the electrodes.

Separator 307 is formed in a "pocket" configuration, wherein it is folded back upon itself and the transverse ends secured together for providing an opening 308 between the transverse ends. For ease of illustration, separator 307 is shown as having two fold lines. In practice, however, a single fold line is used as the separator is abutted directly against the opposed electrodes. The porous nature of the separator allows the movement of ions in the electrolyte between the electrodes.

Each electrode is formed from a single like aluminium sheet having at least one tab 309 which is electrically engaged with the respective terminals 305 and 306. The electrodes are folded into the overlapping and nested configuration shown in the drawing. Again, it will be appreciated that for ease of illustration electrode 304 is shown with two fold lines. In practice, however, a single fold is made as this electrode is abutted directly against separator 307.

Electrode 303 is received within opening 308 and enveloped by separator 307 such that only tab 309 extends from the "pocket" or pouch. This electrode and separator combination is then inserted into the folded electrode 304 to complete a single capacitive cell. While in this embodiment only a single cell is illustrated, in other embodiments use is made of two or more such cells. The electrode area of the electrodes is about 102 $cm^2$ which provides a nominal capacitance of about 28 Farads at 2.5 Volts.

Each of electrodes 303 and 304 includes a high surface area coating 310 of activated carbon. This coating is of a predetermined thickness and includes a binder to facilitate intimate engagement between the carbon and the electrodes.

As terminals 305 and 306 extend from the inside to the outside of housing 302 they are sealingly engaged intermediate their respective ends with the housing. In this embodiment the sealing engagement is effected by two rubber grommets 311 and 312. In other embodiments use is made of grommets constructed from other materials or combinations of materials. For example, some devices make use of silicon sealing compounds and adhesives.

Figure 23:
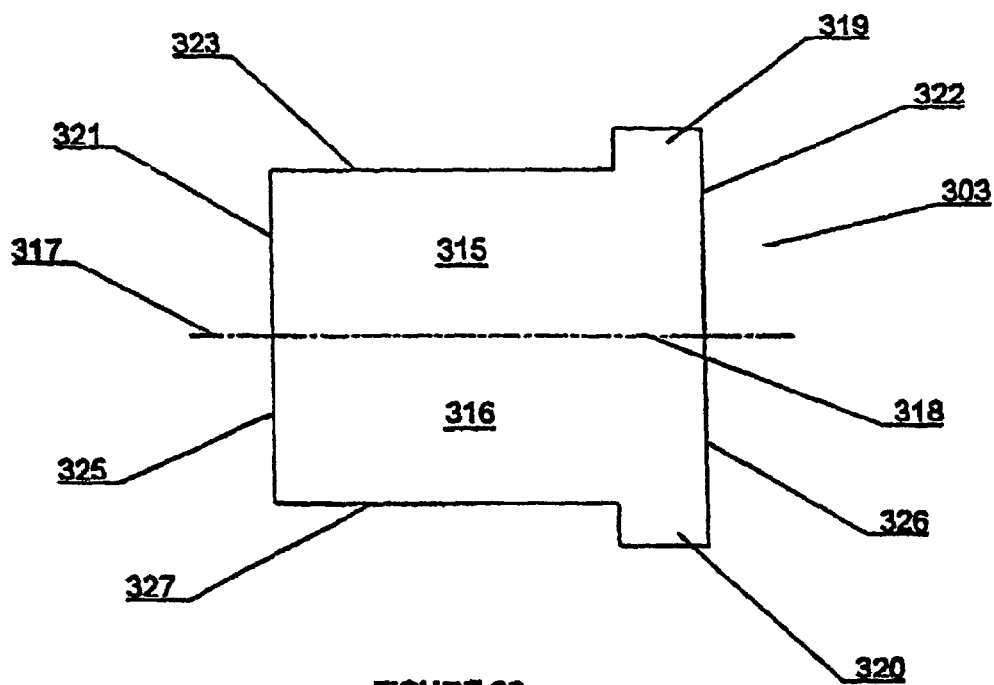
FIG. 23 is a schematic plan view of one of the electrodes of the supercapacitor of FIG. 21.
Figure 24:
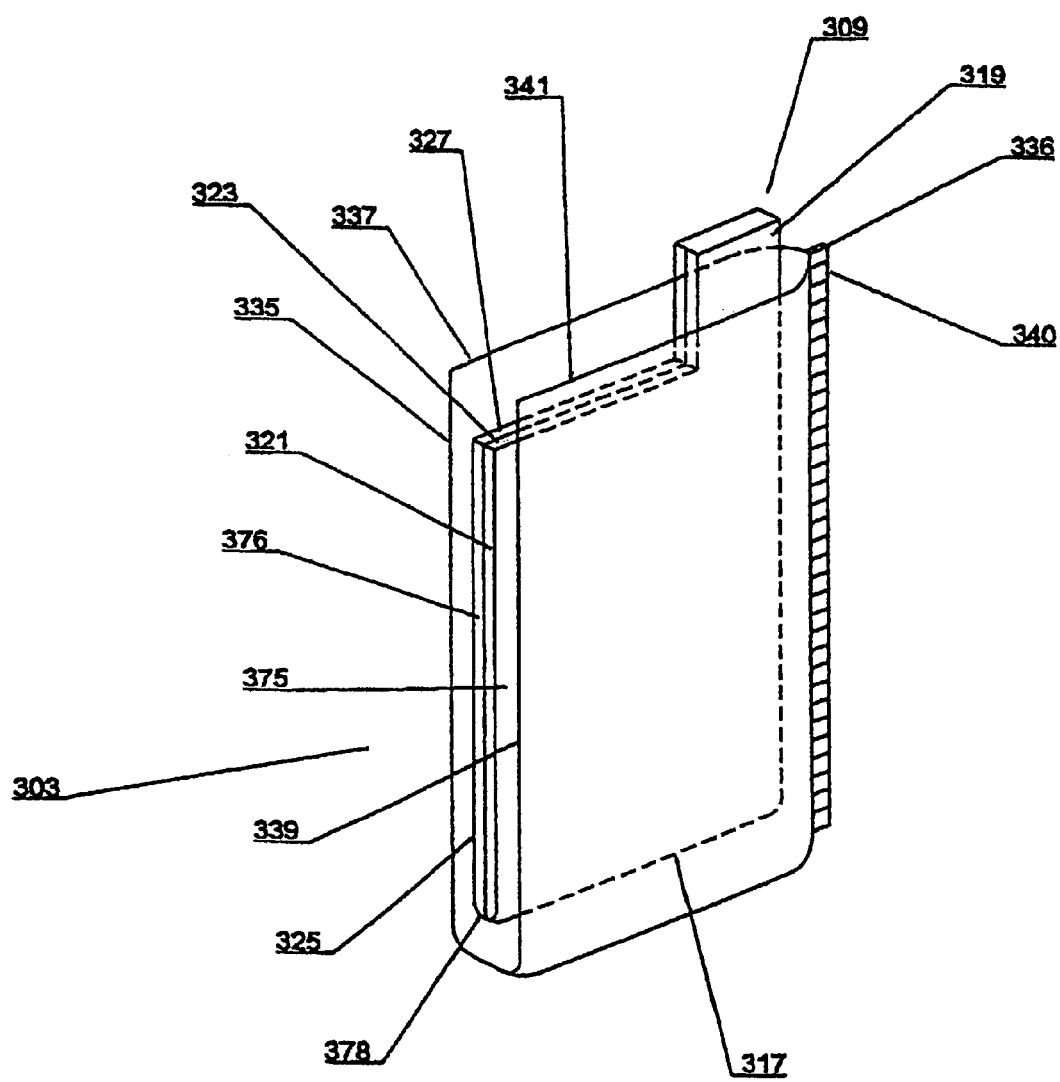
FIG. 24 is a schematic perspective view of an electrode assembly including the separator of FIG. 22 and the electrode of FIG. 23.

Electrode 303 and 304 will now be described in more detail with reference to FIGS. 22 to 24. More particularly, and as best shown in FIG. 23, electrode 303 is substantially rectangular and includes two rectangular sub-sheets 315 and 316. The sub-sheets are integrally formed and symmetrical about a fold line 317 which defines a common edge 318. Sheets 315 and 316 include respective integrally formed rectangular sub-tabs 319 and 320 which, as shown in FIG. 24, abut to collectively define tab 309.

Sheet 315 includes two spaced apart and parallel edges 321 and 322 which extend away normally from edge 318. A further edge 323 extends between edges 321 and 322. As also shown in FIG. 23, tab 319 extends from away from edge 323 adjacent to where that edge meets with edge 322. Similarly, sheet 316 includes two spaced apart and parallel edges 325 and 326 which extend away normally from edge 318. A further edge 327 extends between edges 325 and 326. Similarly also, tab 320 extends from away from edge 327 adjacent to where that edge meets with edge 326.

Electrode 303 is coated on one side only with the activated carbon and then folded about line 317 such that the coated side is outwardly facing, as shown in FIG. 21.

Electrode 304 is the same as electrode 303 only that it is interleaved in the opposite sense so that the respective tabs 309 are spaced apart. This will be described in further detail below. For convenience, corresponding features of the electrodes will be designated with corresponding reference numerals.

Figure 22:
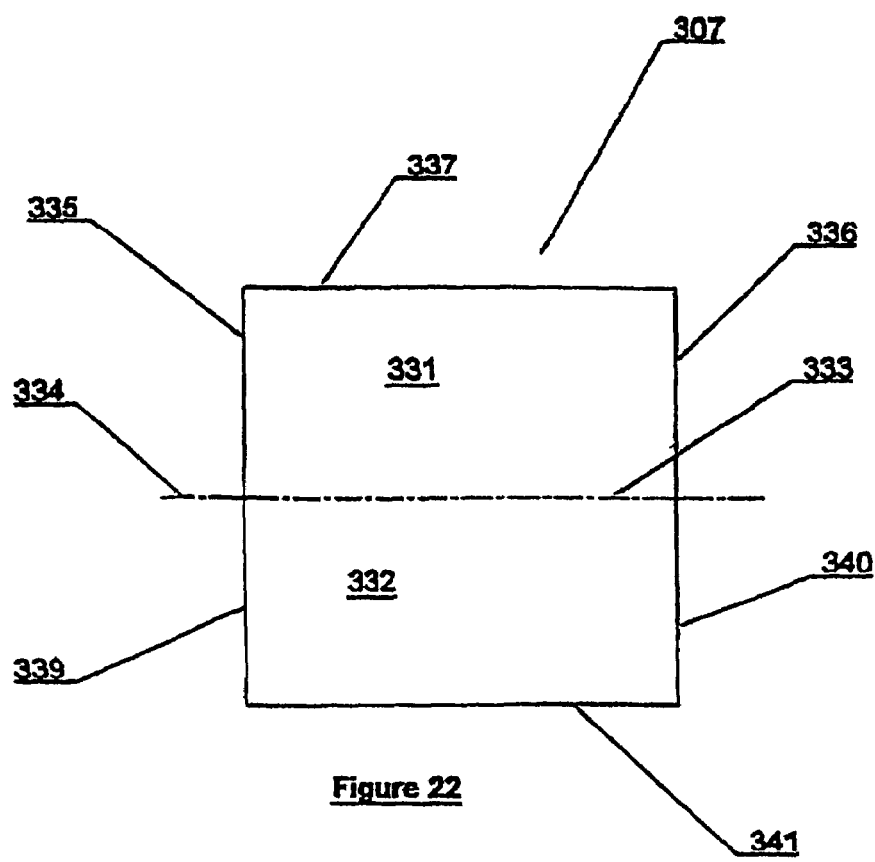
FIG. 22 is a plan view of a separator for the supercapacitor of FIG. 21.

Separator 307 is shown, not to scale, in plan in FIG. 22 and includes two rectangular sub-sheets 331 and 332 which are integrally formed along a common edge 333. This edge also defines a fold line 334. Sheet 331 also includes two spaced apart and parallel edges 335 and 336 which extend away normally from edge 333. A free edge 337 extends between edges 335 and 336. Similarly, sheet 332 includes two spaced apart and parallel edges 339 and 340 which extend away normally from edge 333. A free edge 341 extends between edges 339 and 340.

During manufacture, electrode 303 is folded about line 317 such that the coated sides of sheets 315 and 316 are opposed and outwardly facing. Additionally, tabs 319 and 320 are abutted. Separately, separator 307 is folded about line 334 such that edges 335 and 339 are parallel and abutted together, edges 336 and 340 are parallel abutted together and edges 337 and 341 are parallel and adjacent to one another. Thereafter, edges 335 and 339 are joined together and edges 336 and 340 are joined together. In some embodiments this is achieved with adhesive, while in other embodiments heat welding or other heat treatment is utilised. In still further embodiments the edges are not joined.

As best illustrated in FIG. 24, electrode 303 is then nested within the "pouch" or "pocket" formed by separator 307. As shown, the separator envelopes substantially all of electrode 303 and, as will be described below, maintains electrodes 303 and 304 in a spaced apart configuration. Tab 309 extends outwardly beyond adjacent edges 337 and 341 to allow its electrical connection to terminal 305. For ease of illustration, in FIG. 24 the separator 307 is shown with edges 336 and 340 joined by way of heat welding, while edges 335 and 339 are adjacent, although not yet joined.

Figure 25:
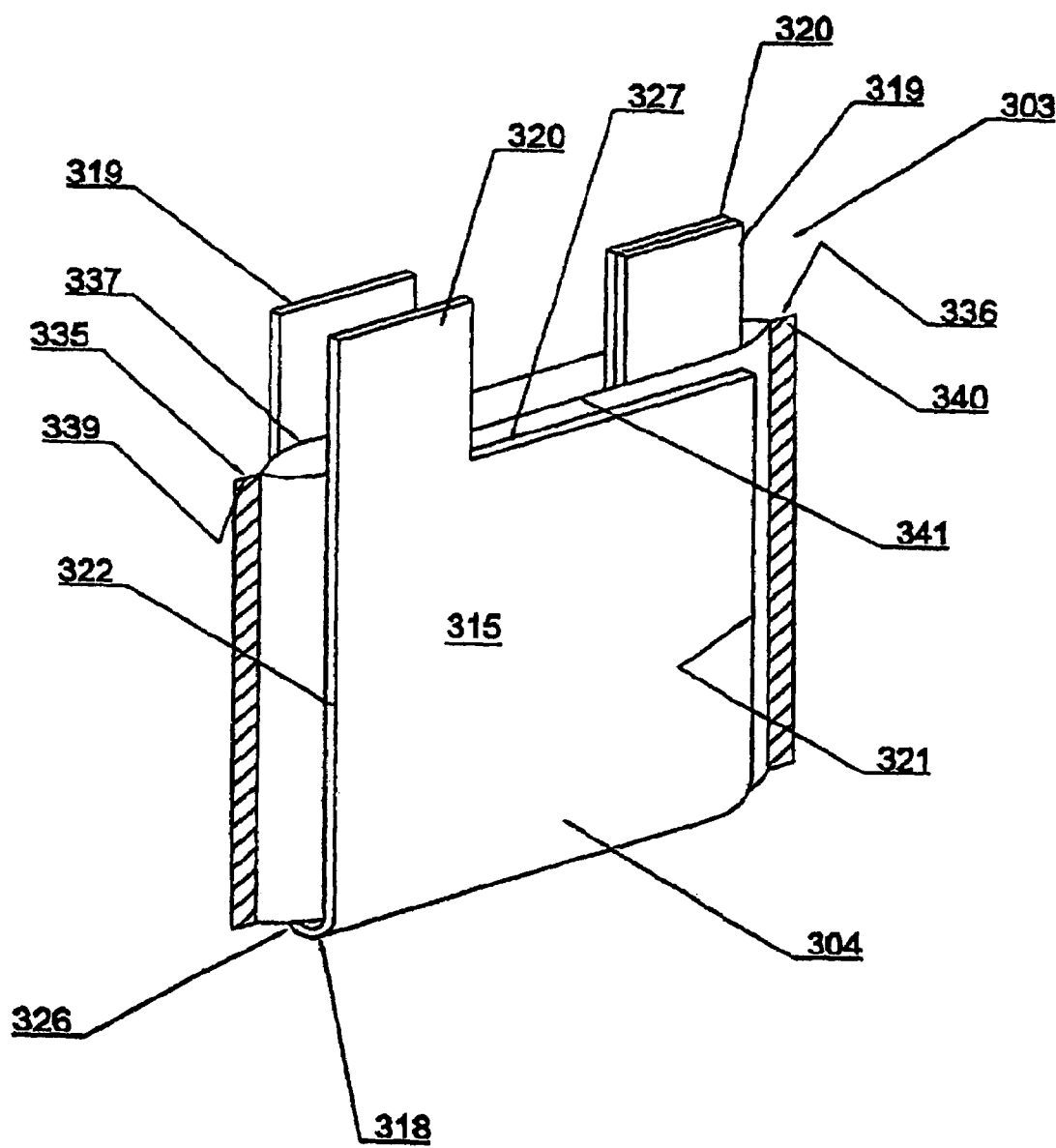
FIG. 25 is a schematic perspective view of the assembly of FIG. 24 nested within a like electrode to that shown in FIG. 23.

Electrode 304 is then formed by folding a like coated sheet to that which forms electrode 303. More particularly, the fold is made along fold line 318 such that that the coated sides of sheets 315 and 316 are opposed sad inwardly facing. Additionally, tabs 319 and 320 are adjacent to each other and opposed. The assembly of FIG. 24 is then nested within electrode 304, as best illustrated in FIG. 25, such that the respective tabs 309 of the electrodes are spaced apart. Tabs 319 and 320 of electrode 304 are then abutted and secured to terminal 306 to allow external electrical connection with the electrode.

The electrode assembly of FIG. 25 is referred to as s single cell and, as would be appreciated by a skilled addressee from the teaching herein, a plurality of the cells are able to be connected in parallel to proportionally increase the capacitance of supercapacitor 301. In other embodiments, a plurality of the cells are stacked in parallel such that the respective tabs 309 for like electrodes 303 and 304 form two spaced apart stacks of like tabs. The tabs in each stack are then clamped together and the stacks electrically connected to respective terminals 305 and 306.

The preferred embodiments of the invention use a non-aqueous electrolyte to achieve high energy densities. Surprisingly, however, they are also able to achieve high power densities and FOM's in spite of the conventional wisdom to the contrary for this type of electrolyte. This result is achieved in the preferred embodiments through a concerted effort to reduce the overall resistance of the supercapacitor. The use of the following features contribute to this result:
  a thin highly porous separator to minimise the length of the current path, and hence the resistance, offered by the electrolyte;
  thin layers of high surface area carbon (less than about 100 microns thick) for providing a short current path through the carbon to the aluminium electrode while still providing a high capacitance per unit volume;
  a blend of carbons including conductive carbon black for improving the conductivity of the carbon layer; and
  an electrolyte including a high concentration of salt (in the order of 1.0 Molar).

In some embodiments the thickness of each carbon coating, including the binder, is less than 100 microns. For the examples shown in FIGS. 17 and 20 the respective carbon coating thicknesses are specified. With the exception of the 6 micron coating, the carbon particle diameter is a nominal 6 to 8 microns. However, for the 6 micron coating use is made of similar size particles that are ground to a nominal diameter of 2 microns. In embodiments where use is made of smaller nominal diameter carbons, the coatings are thinner again.

The conventional wisdom has been to utilise relatively thick carbon coatings to provide a greater capacitance per unit volume. Such coatings are in the order of about 150 microns or greater. However, it has been discovered that thinner coatings, as used in the described embodiments, allows a reduced esr as the length of the current path through the carbon coating is small. The thin coatings also have a positive contribution to a high FOM's as they occupy less volume than the thicker coatings employed in prior art devices. Surprisingly, however, the devices according to the preferred embodiments of the invention still provide relatively high capacitance as the available surface area remains relatively high due to the use of an activated carbon and a protonated binder.

While not wishing to be limited by theory, it is presently understood, when thinner coatings are used, that another mechanism comes into play. More particularly, the activated carbon used in the preferred embodiments results in interparticle voids in the carbon coating. These voids are typically labrinthine in character. For prior art coatings having a thickness which is significantly greater than the carbon particle size, the impedance of the coating is high. However, for the coatings of the preferred embodiments, where the coating thickness is the same order of magnitude as the carbon particle size, the effect of the interparticle voids is minimal on the impedance. That is, it has been discovered that there is a strong relationship between the size of the active carbon particle, the thickness of the carbon layer and the resultant impedance provided by that layer.

Preferred embodiments of the invention make use of thinner carbon coatings to take advantage of this relationship and thereby achieve greater capacitances per unit volume, and hence high FOM'S.

The volume and mass measurements for determining FOM's take into account the packaging in which the electrodes, the separator and electrolyte are contained. The high FOM's achievable with the described embodiments of the invention are also contributed to by the packaging itself and the compact method of disposing the separate components within the packaging.

For the larger supercapacitors constructed in accordance with the invention it is known to use heavier and bulkier packaging than is absolutely necessary and still achieve relatively high FOM's. For example, in cases where it is desirable to have highly robust packaging for operation in hostile environments some compromise in FOM is tolerated. However, for these larger devices, the relatively high FOM's are still possible due to the packaging contributing proportionally less to the overall volume or weight of the device.

For some of the smaller devices, the high FOM's are achieved, in part, through use of flexible multi-layer plastics packaging. Examples of such packing are disclosed in the co-pending International Patent Application no. PCT/AU99/00780 in the name of the present applicants. The disclosure within that PCT application is incorporated herein by way of cross reference.

Although the invention has been described with reference to specific examples it will be appreciated by those skilled in the art that it may be embodied in many other forms.

The invention claimed is:

1. A charge storage device comprising:
   a first electrode;
   a second electrode being opposed to and spaced apart from the first electrode;
   a porous separator disposed between the electrodes;
   a sealed package for containing the electrodes, the separator and an electrolyte in which the electrodes are immersed; and
      a first terminal and a second terminal being electrically connected to the first electrode and the second electrode respectively and both extending from the package to allow external electrical connection to the respective electrodes, wherein the gravimetric FOM of the device is greater than about 2.1 Watts/gram.

2. A device according to claim 1 including a gravimetric FOM in one of the following ranges:
   about 2.5 Watts/gram to 3 Watts/gram; or
   about 3 Watts/gram to 3.5 Watts/gram; or
   about 3.5 Watts/gram to 5 Watts/gram; or
   greater than about 5 Watts/gram.

3. A device according to claim 1 wherein the first electrode and the second electrode form a capacitive cell and the device includes a plurality of like cells disposed within the package, each cell being electrically connected in parallel with at least one other cell in the package.

4. A device according to claim 1 wherein the first electrode and the second electrode form a capacitive cell and the device includes a plurality of like cells disposed within the package, each cell being electrically connected in series with at least one other cell in the package.

5. A device according to claim 1 wherein the first electrode and the second electrode form a capacitive cell and the device includes a plurality of like cells disposed within the package, each cell being electrically connected with at least one other cell in the package, wherein the connects are a combination of parallel and series connects.

6. A device according to claim 1 wherein the first electrode and the second electrode include a first carbon coating and a second carbon coating respectively wherein the surface area of carbon used in the coatings is greater than 20 $m^2$/gram.

7. A device according to claim 1 wherein the first electrode includes a first substrate and a first carbon layer supported by the first substrate, and the second electrode includes a second substrate and a second carbon layer supported by the second substrate, wherein the first and second carbon layers are opposed and includes a surface area of at least 400 $m^2$/gram and the gravimetric FOM of the device is greater than about 1 Watts/gram.

8. A device according to claim 7 wherein the surface area of the carbon layers are at least 1200 $m^2$/gram.

9. A device according to claim 8 wherein at least one of the carbon layers contains more than one type of carbon.

10. A device according to claim 9 wherein the carbon layers are a mixture of particles of high surface area carbon and highly conductive carbon in a ratio of about 2.5:1 combined with a suspension of carboxy methyl cellulose (CMC).

11. A device according to claim 1 wherein the maximum operating voltage of the device is less than about 4 Volts.

12. A device according to claim 11 wherein the maximum operating voltage of the device is less than about 3.5 Volts.

13. A device according to claim 12 wherein the maximum operating voltage of the device is less than about 3 Volts.

14. A device according to claim 1 wherein the response time ($T_0$) of the device is less than about 0.09 seconds.

15. A device according to claim 14 wherein the response time ($T_0$) of the device is less than about $10^{-2}$ seconds.

16. A device according to claim 15 wherein the response time ($T_0$) of the device is less than about $10^{-3}$ seconds.

17. A device according to claim 16 wherein the response time ($T_0$) of the device is less than about $10^{-4}$ seconds.

18. A device according to claim 17 wherein the response time ($T_0$) of the device is less than about $5 \times 10^{-5}$ seconds.

* * * * *